US009439155B2

(12) United States Patent
Iwai et al.

(10) Patent No.: US 9,439,155 B2
(45) Date of Patent: Sep. 6, 2016

(54) TRANSMISSION DEVICE, RECEPTION DEVICE, AND METHOD FOR CONTROLLING TRANSMISSION POWER

(71) Applicant: Panasonic Intellectual Property Corporation of America, Torrance, CA (US)

(72) Inventors: Takashi Iwai, Ishikawa (JP); Kazuki Takeda, Kanagawa (JP); Akihiko Nishio, Osaka (JP); Daichi Imamura, Beijing (CN); Masayuki Hoshino, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 111 days.

(21) Appl. No.: 14/377,147

(22) PCT Filed: Feb. 22, 2013

(86) PCT No.: PCT/JP2013/001004
§ 371 (c)(1),
(2) Date: Aug. 6, 2014

(87) PCT Pub. No.: WO2013/132772
PCT Pub. Date: Sep. 12, 2013

(65) Prior Publication Data
US 2014/0376487 A1 Dec. 25, 2014

(30) Foreign Application Priority Data
Mar. 8, 2012 (JP) ................................ 2012-051836

(51) Int. Cl.
*H04W 52/24* (2009.01)
*H04W 52/40* (2009.01)
(Continued)

(52) U.S. Cl.
CPC .......... *H04W 52/242* (2013.01); *H04L 5/0091* (2013.01); *H04W 52/146* (2013.01); *H04W 52/40* (2013.01); *H04W 52/58* (2013.01); *H04W 72/0406* (2013.01); *H04W 52/362* (2013.01)

(58) Field of Classification Search
CPC . H04L 1/0029; H04L 1/0001; H04L 5/0091; H04W 52/04; H04W 52/146; H04W 52/18; H04W 52/242; H04W 52/32; H04B 7/024; H04B 7/026; H04B 7/18543; H04B 10/293; H04B 10/564

See application file for complete search history.

(56) References Cited

U.S. PATENT DOCUMENTS

| 2010/0246705 A1* | 9/2010 | Shin et al. ................. 375/267 |
| 2012/0127911 A1 | 5/2012 | Nishikawa et al. |
| 2012/0236741 A1* | 9/2012 | Xu ........................ H04B 7/024 370/252 |

FOREIGN PATENT DOCUMENTS

| EP | 2 448 338 A1 | 5/2012 |
| EP | 2 503 829 A1 | 9/2012 |

(Continued)

OTHER PUBLICATIONS

3GPP TS 36.331 V10.1.0, "3rd Generation Partnership Project; Technical Specification Group Radio Access Network; Evolved Universal Terrestrial Radio Access (E-UTRA); Radio Resource Control (RRC); Protocol specification (Release 10)," Mar. 2011, 290 pages.

(Continued)

*Primary Examiner* — Benjamin H Elliott, IV
(74) *Attorney, Agent, or Firm* — Seed IP Law Group PLLC

(57) ABSTRACT

This transmission device can notify of a control value pertaining to transmission power without causing an increase in the amount of signaling. A control unit (103) controls transmission power based on a bit sequence notified from a reception device and the association between the bit sequence and a control value pertaining to transmission power; in the association, each bit sequence is respectively associated with a first control value candidate group and a second control value candidate group; when the device is not the subject of cooperative reception, the control unit (103) calculates a transmission power using a control value candidate associated with the notified bit sequence among the first control value candidate group, and when the device is the subject of cooperative reception, the control unit (103) calculates a transmission power using a control value candidate associated with the notified bit sequence among the second control value candidate group.

12 Claims, 14 Drawing Sheets

(51) Int. Cl.
*H04W 52/58* (2009.01)
*H04W 52/14* (2009.01)
*H04L 5/00* (2006.01)
*H04W 72/04* (2009.01)
*H04W 52/36* (2009.01)

(56) References Cited

FOREIGN PATENT DOCUMENTS

| WO | 2010/150807 A1 | | 12/2010 |
|---|---|---|---|
| WO | WO 2010150807 A1 | * | 12/2010 |
| WO | 2011/060741 A1 | | 5/2011 |

OTHER PUBLICATIONS

Alcatel-Lucent Shanghai Bell, Alcatel-Lucent, "Consideration of uplink power control for PUSCH," R1-113326, 3GPP TSG RAN WG1 Meeting #66bis, Zhuhai, China, Oct. 10-14, 2011, 6 pages.
Huawei, HiSilicon, "Power control design for UL CoMP scenario 3 and 4," R1-112908, 3GPP TSG RAN WG1 Meeting #66b, Zhuhai, China, Oct. 10-14, 2011, 9 pages.
International Search Report dated May 28, 2013, for corresponding International Application No. PCT/JP2013/001004, 2 pages.
Extended European Search Report dated Feb. 20, 2015, for corresponding EP Application No. 13757327.5-1855 / 2824977, 7 pages.

* cited by examiner

| BIT STRING | $P_{o\_UE\_PUSCH}$ [dB] |
|---|---|
| 0000 | −8 |
| 0001 | −7 |
| 0010 | −6 |
| 0011 | −5 |
| 0100 | −4 |
| 0101 | −3 |
| 0110 | −2 |
| 0111 | −1 |
| 1000 | 0 |
| 1001 | 1 |
| 1010 | 2 |
| 1011 | 3 |
| 1100 | 4 |
| 1101 | 5 |
| 1110 | 6 |
| 1111 | 7 |

FIG. 1

| | Non-CoMP UE | CoMP UE |
|---|---|---|
| $\Delta_{step}$ | 1 | 2 |
| $P_{dB\_MIN}$ | -8 | -23 |

FIG. 12A

| | Non-CoMP UE | CoMP UE | | |
|---|---|---|---|---|
| | | $\alpha=0.0$ | $0.0<\alpha\leq 0.6$ | $0.6<\alpha\leq 1.0$ |
| $\Delta_{step}$ | 1 | 1 | 1.5 | 2 |
| $P_{dB\_MIN}$ | -8 | -8 | -15.5 | -23 |

FIG. 12B

TRANSMISSION DEVICE, RECEPTION DEVICE, AND METHOD FOR CONTROLLING TRANSMISSION POWER

TECHNICAL FIELD

The present invention relates to a transmitting apparatus, a receiving apparatus and a transmission power control method.

BACKGROUND ART

In LTE-Advanced (Release 11), which is an evolved version of 3GPP LTE (3rd Generation Partnership Project Long-term Evolution, hereinafter referred to as "LTE"), heterogeneous network (HetNet) is under study, which uses a plurality of base stations providing coverage areas in different sizes, for further capacity improvement.

HetNet is a network that uses a macro base station, which provides a large coverage area, in combination with a pico base station, which provides a small coverage area. The macro base station may also be called "macro cell," "HPN (High Power Node)" or "macro eNB." The pico base station may also be called "pico cell," "LPN (Low Power Node)," "low power RRH (Remote Radio Head)" or "pico eNB."

In LTE-Advanced, studies are being carried out on operation of coordinated transmission/reception by a plurality of base stations (CoMP: coordinated multiple point transmission and reception) in a HetNet environment. CoMP is a communication scheme mainly intended to improve the throughput of a ten Anal (UE) located at a cell edge in which a plurality of base stations (cells) cooperate to transmit and receive signals to and from the terminal.

In the case of uplink CoMP (hereinafter referred to as "UL CoMP"), a plurality of base stations (cells or reception points (RPs)) cooperate to receive uplink signals (uplink signals) transmitted from one terminal. Received signals are combined by the plurality of base stations, and receiving quality is thereby improved.

Next, transmission power control of an uplink data signal (PUSCH (Physical Uplink Shared Channel), uplink data) in conventional (Release 10) LTE-Advanced will be described.

For example, transmission power $P_{PUSCH,c}(i)$ of PUSCH in subframe #i of serving cell #c is calculated according to following equation 1 (e.g., see NPL 1). The "serving cell" refers to a base station (cell) that indicates control information to the terminal. A downlink channel is used to indicate control information. The terminal measures reception levels (RSRP: Reference Signal Received Power) of downlink reference signals transmitted from neighboring base stations, and a base station (cell) that corresponds to the highest RSRP becomes a serving cell for the terminal.

(Equation 1)

$$P_{PUSCH,c}(i) = \min\begin{Bmatrix} P_{CMAX,c}(i), \\ 10\log_{10}(M_{PUSCH,c}(i)) + P_{O\_PUSCH,c}(j) + \\ \alpha_c(j) \cdot PL_c + \Delta_{TF,c}(i) + f_c(i) \end{Bmatrix} \quad [1]$$

In equation 1, $P_{CMAX,c}(i)$ [dBm] represents the maximum transmission power of PUSCH that can be transmitted from the terminal, $M_{PUSCH,c}(i)$ represents the number of frequency resource blocks allocated to PUSCH, $P_{O\_PUSCH,c}(j)$ [dBm] represents a target value (parameter set by the base station) of PUSCH transmission power, $PL_c$ represents a path loss level [dB] measured by the terminal, $\alpha_c(j)$ represents a weighting factor indicating a compensation ratio of path loss ($PL_c$) (a parameter set from the base station {0, 0.4, 0.5, 0.6, 0.7, 0.8, 0.9, 1}), $\Delta_{TF,c}(i)$ represents an offset value dependent on MCS of PUSCH, $f_c(i)$ represents a cumulative value in subframe #i including past values of a TPC (Transmission Power Control) command to be subjected to closed-loop control (control value, e.g., +3 dB, +1 dB, 0 dB, −1 dB).

$P_{O\_PUSCH,c}(j)$ shown in equation 1 is an additional value of two parameters: $P_{O\_NOMINAL\_PUSCH,c}(j)$ and $P_{O\_UE\_PUSCH,c}(j)$. $P_{O\_NOMINAL\_PUSCH,c}(j)$ is a cell-specific parameter (value set for each cell, value used commonly by all terminals in the same cell) which is indicated with a step width of 1 [dB] over a range of −126 to 24 [dBm]. On the other hand, $P_{O\_UE\_PUSCH,c}(j)$ is a terminal-specific parameter (value set for each terminal) which is indicated with a step width of 1 [dB] over a range of −8 to 7 [dBm]. For example, as shown in FIG. 1, $P_{O\_UE\_PUSCH,c}(j)$ represented by a bit string of 4 bits (simply expressed as "$P_{O\_UE\_PUSCH}$" in FIG. 1, and the same shall apply hereinafter) is indicated from the base station to the terminal (e.g., see NPL 1).

Values are set for $P_{O\_PUSCH,c}(j)$ and $\alpha_c(j)$ shown in equation 1 in correspondence with j=0, 1 and 2 respectively according to the type of transmission data. Types of transmission data are, for example, PUSCH transmission to which dynamic scheduling is applied, PUSCH transmission to which semi-persistent scheduling is applied or PUSCH transmission for RACH response.

In the aforementioned transmission power control of PUSCH, when CoMP operation in a HetNet environment is taken into consideration, interference of an uplink signal (hereinafter referred to as "uplink interference") from a terminal (hereinafter referred to as "macro terminal (macro UE)") controlled by a macro base station (macro eNB) to a terminal (hereinafter referred to as "pico terminal (pico UE)") controlled by a pico base station (pico eNB) poses a problem.

FIG. 2 illustrates an example of uplink interference in a HetNet environment.

Power for compensating for path loss between macro UE and macro eNB which is a serving cell is set for uplink transmission power of macro UE shown in FIG. 2. On the other hand, power for compensating for path loss between pico UE and pico eNB is set for uplink transmission power of pico UE shown in FIG. 2. Here, as shown in FIG. 2, when macro UE is located in a region near a cell edge of the macro cell (hereinafter referred to as "cell edge region") or in a place where it is difficult to receive a direct wave from macro eNB (e.g., behind an obstacle such as a building), path loss between macro UE and macro eNB increases. In this case, uplink transmission power set in macro UE is assumed to be greater than uplink transmission power set in pico UE. Thus, in such a situation, an uplink signal transmitted from macro UE may provide uplink interference to an uplink signal transmitted from pico UE. Particularly, as shown in FIG. 2, when macro UE is located near pico cell, the influence of uplink interference becomes greater.

In order to solve the uplink interference problem in a HetNet environment, studies are being carried out on setting of uplink transmission power (power for compensating for path loss with the reception point) intended for a reception point (base station) with a minimum path loss among a plurality of reception points for terminals to which UL CoMP is applied (hereinafter referred to as "CoMP UE"). For example, in FIG. 2, when macro eNB and pico eNB cooperate to receive an uplink signal of macro UE, power for compensating for path loss between pico UE and macro UE is set for uplink transmission power of macro UE (CoMP UE). Thus, since it is possible to reduce an interference level from CoMP UE to pico cell, a system performance improvement effect using UL CoMP can be expected.

When the conventional uplink transmission power for a serving cell is assumed to be given by equation 1, the uplink transmission power intended for a reception point corresponding to a minimum path loss is expressed by equation 2.

(Equation 2)

$$P_{PUSCH,c}(i) = \min\begin{Bmatrix} P_{CMAX,c}(i), \\ 10\log_{10}(M_{PUSCH,c}(i)) + P_{O\_PUSCH,c}(j) + \\ \alpha_c(j) \cdot (PL_c + \Delta_{PL}) + \Delta_{TF,c}(i) + f_c(i) \end{Bmatrix} \quad [2]$$

In addition to the parameter in equation 1, $\Delta_{PL}$ is set in equation 2. Moreover, $\Delta_{PL}$ represents a difference between a minimum path loss level among path loss levels between the terminal and a plurality of reception points, and a path loss level between the terminal and the serving cell (hereinafter referred to as "path loss difference"). For example, $\Delta_{PL}$ set in macro UE shown in FIG. 2 becomes a difference between the path loss level between macro eNB and macro UE, and the path loss level between pico eNB and macro UE.

Path loss difference $\Delta_{PL}$ depends on a transmission power difference between macro eNB and pico eNB. For example, NPL 2 discloses that path loss difference $\Delta_{PL}$ can take values in a range of 0 to −16 [dB]. NPL 3 proposes to newly add a terminal-specific parameter (e.g., path loss difference $\Delta_{PL}$ shown in equation 2) to correct transmission power for CoMP UE in addition to $P_{o\_UE\_PUSCH,c}(j)$.

CITATION LIST

Non-Patent Literature

NPL 1
3GPP TS36.331 V10.1.0, "RRC Protocol Specification (Release 10)," 6.3.2 Radio resource control information elements, March 2011
NPL 2
3GPP RAN1 #66b, R1-112908, Huawei, "Power control design for UL CoMP scenario 3 and 4," China, 10-14 Oct. 2011
NPL 3
3GPP RAN1 #66b, R1-113326, Alcatel-Lucent Shanghai Bell, Alcatel-Lucent, "Consideration of uplink power control for PUSCH," China, 10-14 Oct. 2011

SUMMARY OF INVENTION

Technical Problem

However, as described in NPL 3, when a terminal-specific parameter (e.g., path loss difference $\Delta_{PL}$) to correct transmission power for CoMP UE is newly added, there is a problem in that the number of indication bits necessary for the parameter to be indicated for each terminal (amount of signaling) increases compared to the related art (Release 10).

An object of the present invention is to provide a transmitting apparatus, a receiving apparatus and a transmission power control method that make it possible to indicate a control value relating to transmission power from a base station to a terminal while limiting an increase in the amount of signaling.

Solution to Problem

A transmitting apparatus according to an aspect of the present invention includes: a control section that controls transmission power based on a bit string indicated from a receiving apparatus and a correspondence in which the bit strings are associated with a first control value candidate group and a second control value candidate group relating to transmission power, using, when the transmitting apparatus is not a coordinated reception target of a plurality of receiving apparatuses, a control value candidate associated with the indicated bit string in the first control value candidate group, and using, when the transmitting apparatus is the coordinated reception target, a control value candidate associated with the indicated bit string in the second control value candidate group; and a transmitting section that transmits a signal using the transmission power.

A receiving apparatus according to an aspect of the present invention includes: a signal generating section that generates a control signal including a bit string set based on a correspondence in which the bit strings are associated with a first control value candidate group and a second control value candidate group relating to transmission power of a transmitting apparatus; and a transmitting section that transmits the control signal, in which: when the transmitting apparatus is not a coordinated reception target of a plurality of receiving apparatuses, a control value candidate associated with the set bit string in the first control value candidate group is used, and when the transmitting apparatus is the coordinated reception target, a control value candidate associated with the set bit string in the second control value candidate group is used.

A transmission power control method according to this disclosure is a method for controlling transmission power based on a bit string indicated from a receiving apparatus and a correspondence between the bit strings and a control value relating to transmission power, the method including: associating, in the correspondence, the bit strings with a first control value candidate group and a second control value candidate group; and calculating transmission power, when the transmitting apparatus is not a coordinated reception target of a plurality of receiving apparatuses, a using control value candidate associated with the indicated bit string in the first control value candidate group, and calculating transmission power, when the transmitting apparatus is the coordinated reception target, using a control value candidate associated with the indicated bit string in the second control value candidate group.

Advantageous Effects of Invention

According to the present invention, it is possible to indicate a control value relating to transmission power from a base station to a terminal while limiting an increase in the amount of signaling.

BRIEF DESCRIPTION OF DRAWINGS

FIG. 1 illustrates a correspondence between a bit string and a dB value representing terminal-specific parameters;

FIGS. 12A and 12B illustrate a configuration example of parameters according to another embodiment of the present invention;

DESCRIPTION OF EMBODIMENTS

Figure 2:
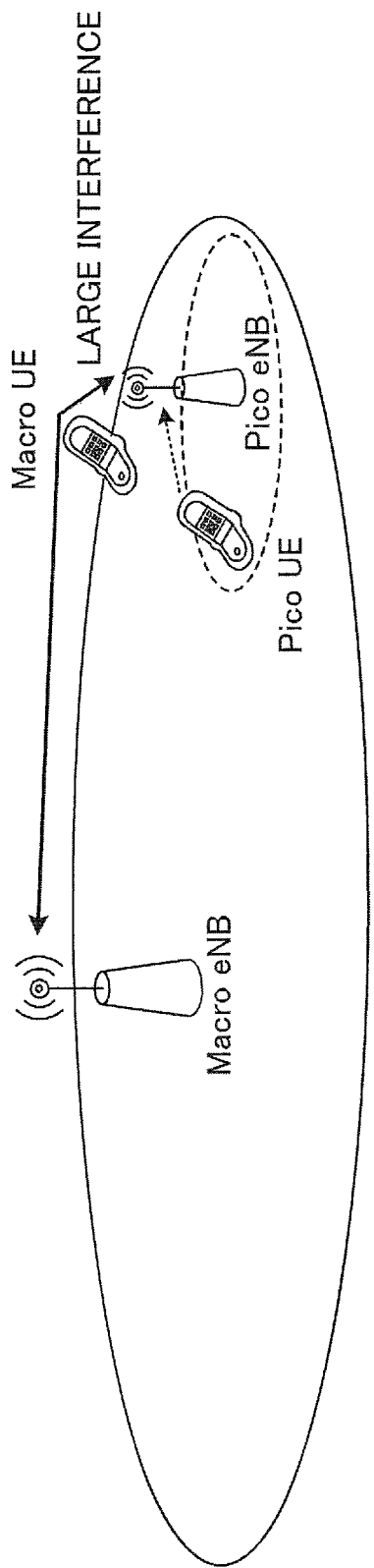
FIG. 2 is a diagram provided for describing interference that occurs when CoMP operation is adopted in a HetNet environment.

Hereinafter, embodiments of the present invention will be described in detail with reference to the accompanying drawings. Throughout the embodiments, the same elements are assigned the same reference numerals and any duplicate description of the elements is omitted.

[Embodiment 1]
[Overview of Communication System]

A communication system according to Embodiment 1 of the present invention includes a transmitting apparatus and a receiving apparatus. In particular, the present embodiment will describe the transmitting apparatus as terminal 100 and the receiving apparatus as base station 200. This communication system is, for example, an LTE-Advanced system. Terminal 100 is, for example, a terminal compliant with the LTE-Advanced system and base station 200 is a base station compliant with the LTE-Advanced system. For example, when terminal 100 operates as CoMP UE that applies UL CoMP, a signal transmitted from terminal 100 is received by a plurality of base stations 200 in cooperation.

Figure 3:
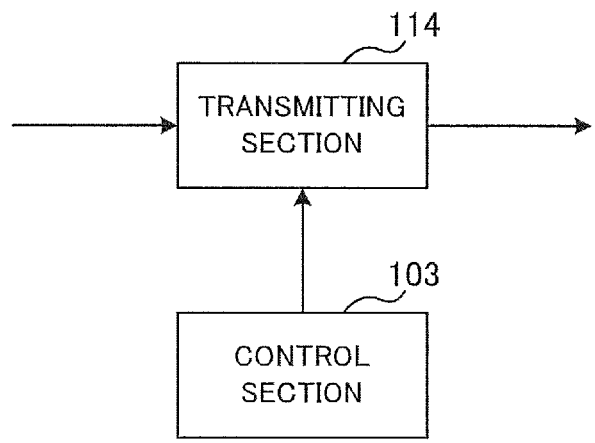
FIG. 3 is a main configuration diagram of a terminal according to Embodiment 1 of the present invention.

FIG. 3 is a main configuration diagram of terminal 100 according to Embodiment 1 of the present invention. In terminal 100 shown in FIG. 3, control section 103 controls transmission power based on a bit string (control information) indicated from base station 200. When terminal 100 is a CoMP UE, the bit string (control information) indicated from base station 200 corresponds to a control value set within a range of values that can be taken by control value candidates of a control value candidate group (first control value candidate group) intended for non-CoMP UE and within a range of values that can be taken as control values relating to control of transmission power during CoMP. Transmitting section 114 transmits a data signal (transmission data) using the transmission power calculated in control section 103.

Figure 4:
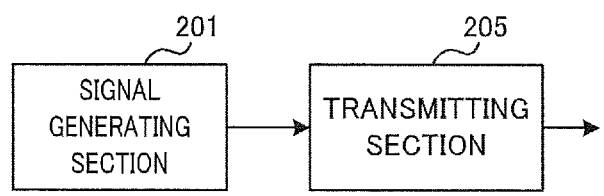
FIG. 4 is a main configuration diagram of a base station according to Embodiment 1 of the present invention.

FIG. 4 is a main configuration diagram of base station 200 according to Embodiment 1 of the present invention. In base station 200 shown in FIG. 4, signal generating section 201 generates a control signal including a bit string indicating a control value relating to transmission power of terminal 100 (transmitting apparatus). When terminal 100 is a CoMP UE, a bit string (control information) generated by signal generating section 201 corresponds to a control value set within a range of values that can be taken by control value candidates of a control value candidate group (first control value candidate group) intended for non-CoMP UE and within a range of values that can be taken as control values relating to control of transmission power during CoMP. Transmitting section 205 transmits the control signals generated in signal generating section 201.

[Configuration of Terminal 100]

Figure 5:
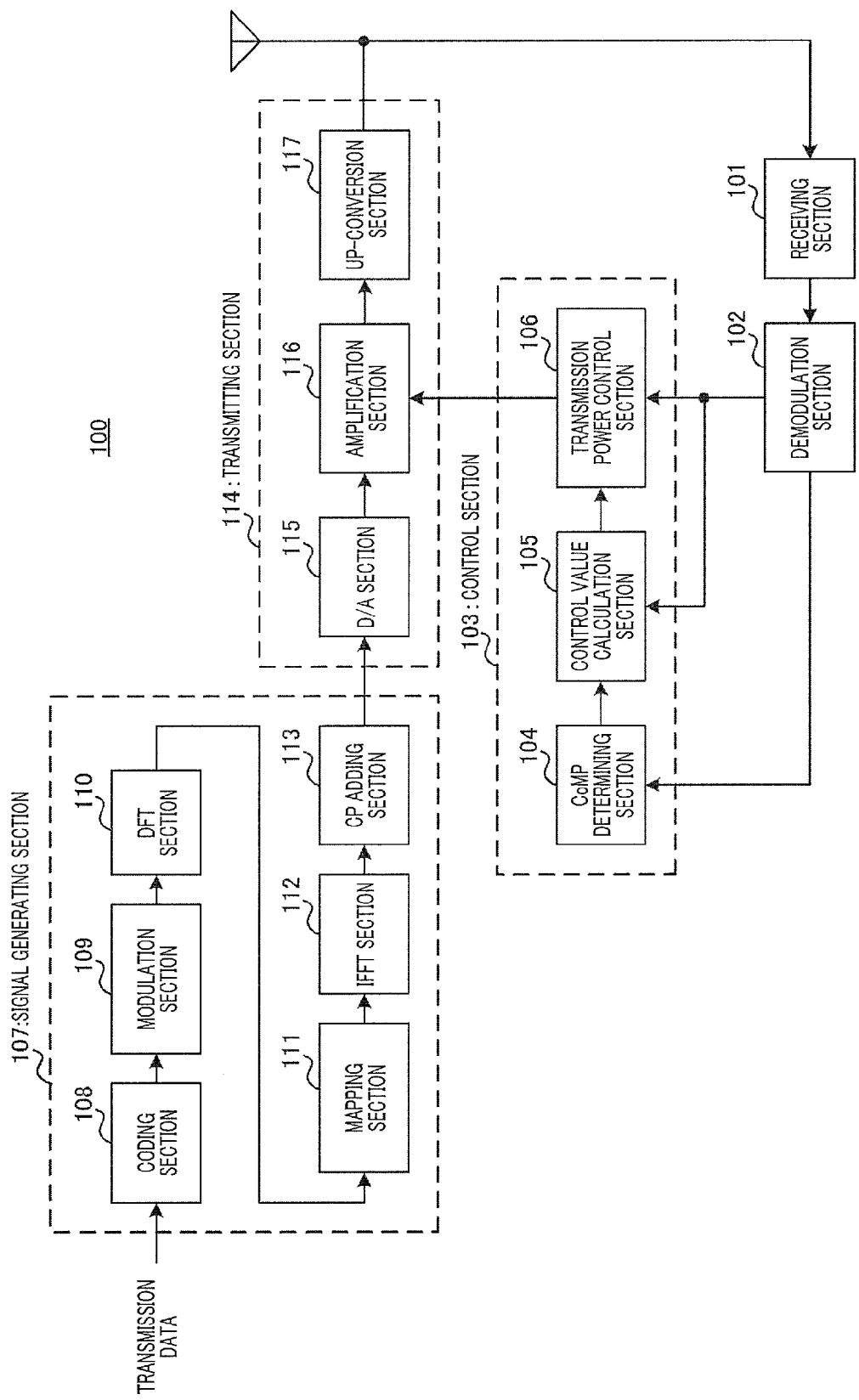
FIG. 5 is a block diagram illustrating a configuration of the terminal according to Embodiment 1 of the present invention.

FIG. 5 is a block diagram illustrating a configuration of terminal 100 according to Embodiment 1 of the present invention.

In terminal 100, receiving section 101 receives a signal transmitted from base station 200 via an antenna, applies reception processing such as down-conversion or ID conversion to the received signal and outputs the received signal subjected to the reception processing to demodulation section 102. The received signal includes control information relating to transmission power control (e.g., parameters shown in equation 1 set from base station 200).

Demodulation section 102 demodulates control information relating to transmission power control of the received signal inputted from receiving section 101 and outputs the demodulated control information to control section 103 (control value calculation section 105 and transmission power control section 106). Demodulation section 102 outputs control information of the received signal not directly related to transmission power control (details will be described later) to control section 103 (CoMP determining section 104).

Control section 103 controls transmission power of a transmission signal (uplink signal) transmitted from terminal 100 based on control information (bit string) indicated from base station 200. Control section 103 includes CoMP determining section 104, control value calculation section 105 and transmission power control section 106.

CoMP determining section 104 determines, based on the control information inputted from demodulation section 102, whether terminal 100 is a terminal (CoMP UE) to which coordinated reception by a plurality of base stations 200 is applicable or not and outputs the determination result to control value calculation section 105. That is, CoMP determining section 104 determines whether terminal 100 is a non-CoMP target terminal (non-CoMP UE) or a CoMP target terminal (CoMP UE).

For example, CoMP determining section 104 may also implicitly determine, based on the control information configured in terminal 100, whether terminal 100 is a CoMP UE or a non-CoMP UE. The control information configured in terminal 100 is, for example, sequence group numbers for terminal-specific reference signals necessary to apply UL CoMP, sequence numbers for terminal-specific reference signals, and virtual cell ID to obtain sequence group numbers for reference signals. CoMP determining section 104 determines terminal 100 in which the above-described control information is configured or terminal 100 in which the above-described control information can be configured, as a CoMP UE and deter mines terminal 100 in which the above-described control information is not configured or terminal 100 in which the above-described control information cannot be configured, as a non-CoMP UE.

Alternatively, when terminal 100 transmits a signal to a base station other than base station 200 (serving cell) from which control information (e.g., above-described bit string) intended for terminal 100 is indicated, CoMP determining section 104 may determine that terminal 100 is a CoMP UE (coordinated reception target) and when terminal 100 transmits a signal to base station 200 (serving cell) from which control information intended for terminal 100 is indicated, CoMP determining section 104 may determine that terminal 100 is a non-CoMP UE (not coordinated reception target).

In addition, information indicating whether terminal 100 is a CoMP UE or not may be explicitly indicated from base station 200 to terminal 100. In this case, CoMP determining section 104 determines whether terminal 100 is a CoMP UE or non-CoMP UE based on the information.

Control value calculation section 105 calculates a control value of transmission power using the control information relating to transmission power control inputted from demodulation section 102 according to the determination result inputted from CoMP determining section 104. More specifically, when terminal 100 is a non-CoMP UE, control value calculation section 105 uses the control information relating to transmission power control as non-CoMP UE control information. On the other hand, when terminal 100 is a CoMP UE, control value calculation section 105 uses the control information relating to transmission power control as CoMP UE control information. When terminal 100 is a CoMP UE, the above-described control information relating to transmission power control (bit string) indicates a control value set within a range of values that can be taken by non-CoMP UE control value candidates and within a range of values that can be taken as a control value relating to control of transmission power during CoMP. Control value calculation section 105 outputs the calculated control value to transmission power control section 106.

An example of control values of transmission power is $P_{o\_UE\_PUSCH,c}(j)$, which is a terminal-specific parameter used to calculate $P_{o\_PUSCH,c}(j)$ shown in equation 1. For example, when terminal 100 is a non-CoMP UE, an example of the control information relating to transmission power control indicated from base station 200 is a bit string corresponding to $P_{o\_UE\_PUSCH,c}(j)$ shown in FIG. 1. On the other hand, when terminal 100 is a CoMP UE, $P_{o\_UE\_PUSCH,c}(j)$ corresponding to the control information relating to transmission power control (bit string) indicated from base station 200 includes, in addition to a value (e.g., −8 to 7 dB shown in FIG. 1) for correcting a conventional path loss estimation error, a value (e.g., value taking $\Delta_{PL}$ into account shown in equation 2) for correcting transmission power intended for an optimum reception point (reception point having smaller path loss) for CoMP UE. Details of the control values of transmission power in the present embodiment will be described later.

Transmission power control section 106 determines transmission power $P_{PUSCH,c}(j)$ of a data signal (PUSCH) based on the control value ($P_{o\_UE\_PUSCH,c}(j)$) Of transmission power inputted from control value calculation section 105 and control information (e.g., $P_{o\_NOMINAL\_PUSCH,c}(j)$ which is a cell-specific parameter) relating to the transmission power control inputted from demodulation section 102, and outputs the determined transmission power to transmitting section 114 (amplification section 116). More specifically, transmission power control section 106 adds up cell-specific parameter $P_{o\_NOMINAL\_PUSCH,c}(j)$ and terminal-specific parameter $P_{o\_UE\_PUSCH,c}(j)$ to derive $P_{o\_PUSCH,c}(j)$. Transmission power control section 106 then determines transmission power $P_{PUSCH,c}(j)$ of the data signal (PUSCH) according to equation 1 using derived $P_{o\_PUSCH,c}(j)$.

Signal generating section 107 performs signal generation processing in accordance with a configured transmission scheme on the inputted transmission data. For example, when the transmission scheme is an OFDM (Orthogonal Frequency Division Multiplexing) scheme, signal generating section 107 includes coding section 108, modulation section 109, DFT (Discrete Fourier Transform) section 110, mapping section 111, IFFT (Inverse Fast Fourier Transform) section 112, and CP (Cyclic Prefix) adding section 113. However, the transmission scheme is not limited to the OFDM scheme, and signal generating section 107 adopts a configuration in accordance with the configured transmission scheme.

Coding section 108 encodes transmission data, outputs the coded data to modulation section 109, modulation section 109 modulates the coded data inputted from coding section 108 and outputs the modulated data to DFT section 110.

DFT section 110 applies DFT processing to the modulated data signal inputted from modulation section 109 and outputs the processed signal to mapping section 111.

Mapping section 111 maps the data signal after the DFT processing inputted from DFT section 110 to frequency resources based on frequency resource allocation information (not shown) indicated from base station 200 and outputs the mapped signal to IFFT section 112.

IFFT section 112 performs IFFT processing on a plurality of subcarriers to which the data signals are mapped and outputs the signals after the IFFT processing to CP adding section 113.

CP adding section 113 adds the same signal as the end portion of the signal after IFFT inputted from IFFT section 112 to the top portion as a CP and outputs the signal with the CP to transmitting section 114 (D/A section 115).

Transmitting section 114 performs transmission processing on the signal (PUSCH) inputted from signal generating section 107 using the transmission power value ($P_{PUSCH,c}(j)$) inputted from control section 103 and transmits the signal after the transmission processing via an antenna. Transmitting section 114 includes D/A section 115, amplification section 116 and up-conversion section 117.

D/A section 115 performs D/A conversion on the signal inputted from CP adding section 113 and outputs the signal after the D/A conversion to amplification section 116.

Amplification section 116 amplifies transmission power of the signal inputted from D/A section 115 according to the transmission power inputted from transmission power control section 106, and outputs the amplified signal to up-conversion section 117.

Up-conversion section 117 performs frequency conversion on the signal inputted from amplification section 116 to a carrier frequency. Up-conversion section 117 transmits the signal after the transmission processing via an antenna.

[Configuration of Base Station 200]

Figure 6:
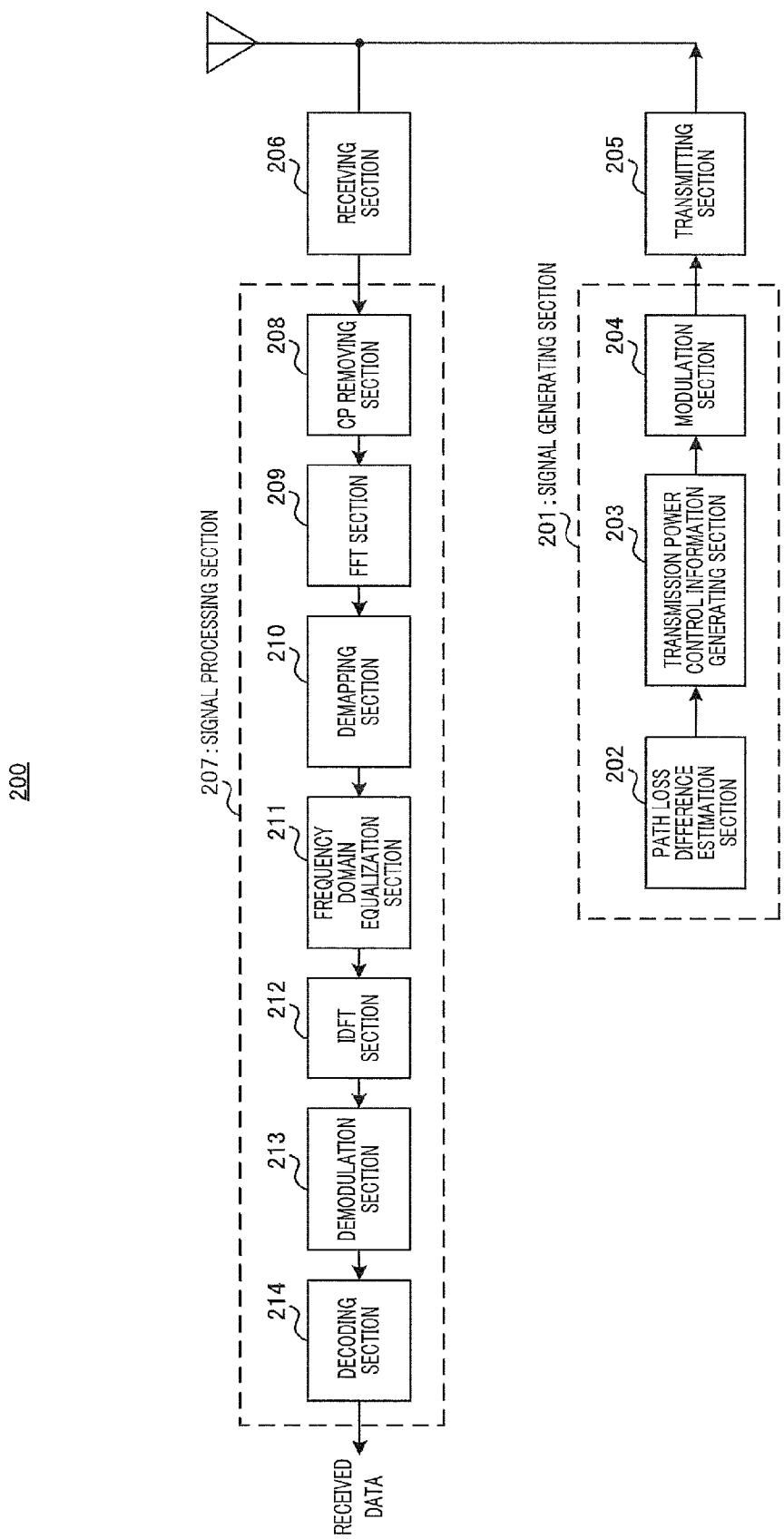
FIG. 6 is a block diagram illustrating a configuration of the base station according to Embodiment 1 of the present invention.

FIG. 6 is a block diagram illustrating a configuration of base station 200 according to Embodiment 1 of the present invention.

In base station 200, signal generating section 201 generates control information relating to transmission power control for each terminal 100 and performs signal generation processing on the generated control information. Signal generating section 201 includes path loss difference estimation section 202, transmission power control information generating section 203 and modulation section 204.

Path loss difference estimation section 202 estimates a difference (path loss difference: $\Delta_{PL}$) from a minimum path loss among path losses between terminal 100 and base station 200, and between terminal 100 and each reception point, and outputs the estimated path loss difference to transmission power control information generating section 203.

For example, reception levels (RSRP: Reference Signal Received Power) of uplink signals (PUSCH, SRS (Sounding Reference Signal) or PRACH (Physical Random Access Channel) or the like) transmitted from terminal 100 may be measured simultaneously at a plurality of reception points and base station 200 (scheduler (not shown) within the area in which CoMP is applicable) may receive measurement results from a plurality of reception points. Path loss difference estimation section 202 may calculate the difference among the measurement results to thereby derive the above-described path loss difference. Alternatively, path loss difference estimation section 202 may also derive a path loss difference using reception levels (RSRP) of reference signals from neighboring cells (a plurality of reception points) periodically indicated from terminal 100 to a serving cell.

Transmission power control information generating section 203 generates control information relating to transmission power control of terminal 100 and outputs the generated control information to modulation section 204. More specifically, transmission power control information generating section 203 determines transmission power appropriate to terminal 100 based on receiving quality of terminal 100 and generates parameters (including terminal-specific parameter $P_{o\_UE\_PUSCH,c}(j)$ set by base station 200 shown in equation 1. However, when terminal 100 is a non-CoMP UE, transmission power control information generating section 203 determines terminal-specific parameter $P_{o\_UE\_PUSCH,c}(j)$ [dB] so as to obtain transmission power intended for the serving cell. On the other hand, when terminal 100 is a CoMP UE, transmission power control information generating section 203 determines terminal-specific parameter $P_{o\_UE\_PUSCH,c}(j)$ [dB] using the path loss difference inputted from path loss difference estimation section 202 so as to obtain transmission power intended for a reception point with a minimum path loss.

Modulation section 204 modulates the control information relating to transmission power control outputted from transmission power control information generating section 203 and outputs the modulated information to transmitting section 205.

Transmitting section 205 performs transmission processing such as D/A conversion, up-conversion, or amplification on the signal inputted from modulation section 204 and transmits the signal subjected to the transmission processing via an antenna.

On the other hand, receiving section 206 receives signals transmitted from a terminal via an antenna, applies reception processing such as down-conversion, or A/D conversion to the received signal and outputs the received signal subjected to the reception processing to CP removing section 208.

Signal processing section 207 performs signal generation processing on the received signals inputted from receiving section 206 in accordance with the configured transmission scheme. For example, when the transmission scheme is an OFDM scheme, signal processing section 207 includes CP removing section 208, FFT (Fast Fourier Transform) section 209, demapping section 210, frequency domain equalization section 211, IDFT (Inverse Discrete Fourier Transform) section 212, demodulation section 213, and decoding section 214. However, signal processing section 207 is assumed to adopt a configuration in accordance with the configured transmission scheme without the transmission scheme being limited to the OFDM scheme.

CP removing section 208 removes a CP added to the top portion of the received signal inputted from receiving section 206, outputs the received signals to FFT section 209, and FFT section 209 applies FFT processing to the received signal inputted from CP removing section 208, converts the received signal to frequency domain signal and outputs the signal converted to the frequency domain signals to demapping section 210.

Demapping section 210 as extracting means extracts a signal corresponding to a transmission band of terminal 100 and outputs the extracted signal to frequency domain equalization section 211.

Frequency domain equalization section 211 applies equalization processing to the signal inputted from demapping section 210, outputs the processed signal to IDFT section 212 and IDFT section 212 applies IDFT processing to the signal inputted from frequency domain equalization section 211 and outputs the processed signal to demodulation section 213.

Demodulation section 213 applies demodulation processing to the signal inputted from IDFT section 212, outputs the demodulated signal to decoding section 214, and decoding section 214 applies decoding processing to the signal inputted from demodulation section 213 and extracts received data.

[Operation of Terminal 100 and Base Station 200]

Operation of terminal 100 and base station 200 having the configurations described above will be described.

For example, in equation 2, $P_{o\_PUSCH,c}(j)$ used for transmission power control intended for the serving cell is assumed to be $P_{o\_UE\_PUSCH,c,serving}(j)$ and $P_{o\_PUSCH,c}(j)$ used for transmission power control for a reception point having a minimum path loss is assumed to be $P_{o\_PUSCH,c,min}(j)$. In this case, a relationship shown in following equation 3 holds between $P_{o\_PUSCH,c,serving}(j)$ and $P_{o\_PUSCH,c,min}(j)$.

[3]

$$P_{O\_PUSCH,c,min}(j)=P_{O\_PUSCH,c,serving}(j)-\alpha_c(j)\cdot\Delta_{PL} \quad \text{(Equation 3)}$$

That is, $P_{o\_PUSCH,c,min}(j)$ is obtained by changing $P_{o\_PUSCH,c,serving}(j)$ to a value smaller by $\alpha_c(j)\cdot\Delta_{PL}$. That is, it is possible to perform transmission power control for intended CoMP UE by changing conventional $P_{o\_PUSCH,c}(j)$ (control value relating to transmission power control intended for the serving cell) which is a parameter indicated from base station 200 to terminal 100 to a value by $\alpha_c(j)\cdot\Delta_{PL}$ smaller.

Here, path loss difference $\Delta_{PL}$ is determined in dependence on the position of terminal 100. That is, path loss difference $\Delta_{PL}$ can be said to be a terminal-specific parameter. As described above, $P_{o\_PUSCH,c}(j)$ shown in equation 2 (corresponding to $P_{o\_PUSCH,c,serving}(j)$ shown in equation 3) is expressed by two parameters of cell-specific parameter $P_{o\_NOMINAL\_PUSCH,c}(j)$ and terminal-specific parameter $P_{o\_UE\_PUSCH,c}(j)$.

Thus, the change of $P_{o\_PUSCH,c}(j)$ (change from $P_{o\_PUSCH,c,serving}(j)$ to $P_{o\_PUSCH,c,min}(j)$) can be indicated from base station 200 to terminal 100 using $P_{o\_UE\_PUSCH,c}(j)$ which is a terminal-specific parameter. More specifically, a value taking into account both $P_{o\_PUSCH,c,serving}(j)$ shown in equation 3 and path loss difference $\Delta_{PL}$ can be set for each terminal 100 as $P_{o\_UE\_PUSCH,c}(j)$, which is a terminal-specific parameter.

It is an object of indication of conventional $P_{o\_UE\_PUSCH,c}(j)$ (−8 to 7 [dB], e.g., see FIG. 1) to correct a measurement error of path loss in terminal 100. On the other hand, when $P_{o\_UE\_PUSCH,c}(j)$ is indicated as an object to change transmission power of CoMP UE taking into account aforementioned path loss difference $\Delta_{PL}$ in addition to the object to correct a path loss measurement error, it is necessary to set $P_{o\_UE\_PUSCH,c}(j)$ within a range in consideration of both objects. For example, when −8 to 7 [dB] shown in FIG. 1 is assumed as the correction range of a measurement error of path loss and 0 to −16 [dB] is assumed as a range of path loss difference $\Delta_{PL}$, the setting range of $P_{o\_UE\_PUSCH,c}(j)$ also in consideration of path loss difference $\Delta_{PL}$ is −24 to 7 [dB].

In this way, each candidate of $P_{o\_UE\_PUSCH,c}(j)$, which is a control value relating to transmission power intended for CoMP UE, is set as a control value within a range of values that can be taken by conventional $P_{o\_UE\_PUSCH,c}(j)$, which is a control value relating to transmission power intended for non-CoMP (−8 to 7 [dB]) and within a range of values that can be taken as a control value relating to control of transmission power during CoMP (−24 to 7 [dB]).

Next, a case where $P_{o\_UE\_PUSCH,c}(j)$ taking into account path loss difference $\Delta_{PL}$ is indicated is compared to a case where $P_{o\_UE\_PUSCH,c}(j)$ and $\Delta_{PL}$ shown in equation 2 are indicated individually. When $P_{o\_UE\_PUSCH,c}(j)$ and $\Delta_{PL}$ are indicated individually, 4 bits to indicate $P_{o\_UE\_PUSCH,c}(j)$ (−8 to 7 [dB]) (see FIG. 1) and 5 bits to indicate path loss difference $\Delta_{PL}$ (0 to −16 [dB]), a total of 9 bits are necessary. On the other hand, when $P_{o\_UE\_PUSCH,c}(j)$ taking into account path loss difference $\Delta_{PL}$ is indicated, 5 bits are necessary to indicate $P_{o\_UE\_PUSCH,c}(j)$ (−24 to 7 [dB]). That is, the number of indication bits (amount of signaling) can be reduced by setting and indicating $P_{o\_UE\_PUSCH,c}(j)$ taking into account path loss difference $\Delta_{PL}$ rather than the case where $\Delta_{PL}$, which is a new terminal-specific parameter, is indicated in addition to $P_{o\_UE\_PUSCH,c}(j)$.

That is, according to the present embodiment, it is possible to limit an increase in the amount of signaling from the amount of signaling (4 bits in FIG. 1) necessary to indicate conventional $P_{o\_UE\_PUSCH,c}(j)$ and indicate a control value relating to transmission power intended for CoMP UE from base station 200 to terminal 100.

[Embodiment 2]

A case has been described in Embodiment 1 where $P_{o\_UE\_PUSCH,c}(j)$ taking into account path loss difference $\Delta_{PL}$ is indicated without additionally indicating $\Delta_{PL}$, which is a terminal-specific parameter. However, the conventional (Release 10 or LTE) signaling format needs to be changed to a signaling format intended for LTE-Advanced (Release 11) in this case. However, in LTE-Advanced (Release 11), it is preferable, from the standpoint of complexity of the system, that there be no change from the conventional (Release 10) signaling format.

Thus, in the present embodiment, a correspondence between a bit string and a control value ($P_{o\_UE\_PUSCH,c}(j)$) is made to differ between non-CoMP UE and CoMP UE.

A base station and a terminal according to the present embodiment have basic configurations common to those of terminal 100 and base station 200 according to Embodiment 1, and therefore their configurations will be described with reference to FIG. 3 to FIG. 6.

[Main Configurations of Terminal 100 and Base Station 200]

FIG. 3 is a main configuration diagram of terminal 100 according to Embodiment 2 of the present invention. In terminal 100 shown in FIG. 3, control section 103 controls transmission power based on a bit string (control information) indicated from base station 200 and an association between the bit string and a control value relating to transmission power. In the above-described association, each bit string is associated with a control value candidate group intended for non-CoMP UE (first control value candidate group) and a control value candidate group intended for CoMP UE (second control value candidate group). When terminal 100 is not a CoMP (coordinated reception) target by a plurality of base stations 200, control section 103 calculates transmission power using a control value candidate associated with the indicated bit string of the control value candidate group intended for non-CoMP, and when terminal 100 is a CoMP target, control section 103 calculates transmission power using a control value candidate associated with the indicated bit string of the control value candidate group intended for CoMP.

FIG. 4 is a main configuration diagram of base station 200 according to Embodiment 2 of the present invention. In base station 200 shown in FIG. 4, signal generating section 201 generates a control signal including a bit string set based on a correspondence in which each bit string is associated with a control value candidate group intended for non-CoMP UE relating to transmission power of terminal 100 (transmitting apparatus) (first control value candidate group) and a control value candidate group intended for CoMP UE (second control value candidate group). When terminal 100 is not a CoMP (coordinated reception) target by a plurality of base stations 200, signal generating section 201 uses a control value candidate associated with the set bit string of the control value candidate group intended for non-CoMP UE, and when terminal 100 is a CoMP target, signal generating section 201 uses a control value candidate associated with the set bit string of the control value candidate group intended for CoMP UE.

[Configurations of Terminal 100 and Base Station 200]

In terminal 100 shown in FIG. 5, control value calculation section 105 calculates a control value (dB value) of transmission power corresponding to control information (bit string) with reference to the association rule between control information (bit string) relating to transmission power control and control value ($P_{o\_UE\_PUSCH,c}(j)$: dB value) of the above-described transmission power. Here, the above-described association rule is shared beforehand between terminal 100 and base station 200. In the above-described association rule, different control values are associated with the same bit string depending on whether terminal 100 is a CoMP UE or a non-CoMP UE. Details of the above-described association rule will be described later.

In base station 200 shown in FIG. 6, transmission power control information generating section 203 converts determined terminal-specific parameter $P_{o\_UE\_PUSCH,c}(j)$ (dB value) to a bit string using an association rule between control information (bit string) relating to transmission power control and $P_{o\_UE\_PUSCH,c}(j)$ (dB value) which is a control value of transmission power. The above-described association rule is shared beforehand between terminal 100 and base station 200. Details of the above-described association rule will be described later.

Next, the association rule between control information (bit string) and $P_{o\_UE\_PUSCH,c}(j)$ (dB value) used in control value calculation section 105 of terminal 100 and transmission power control information generating section 203 of base station 200 will be described.

More specifically, in the association rule, each bit string is associated with two types of value, that is, $P_{o\_UE\_PUSCH,c}(j)$ intended for non-CoMP UE and $P_{o\_UE\_PUSCH,c}(j)$ intended for CoMP UE respectively. The same range as the conventional one (e.g., FIG. 1) (−8 to 7 [dB]) is set for $P_{o\_UE\_PUSCH,c}(j)$ intended for non-CoMP UE and a range taking into account path loss difference $\Delta_{PL}$ (−24 to 7 [dB]) is set for $P_{o\_UE\_PUSCH,c}(j)$ intended for CoMP UE in addition to the conventional indication range.

Figure 7:
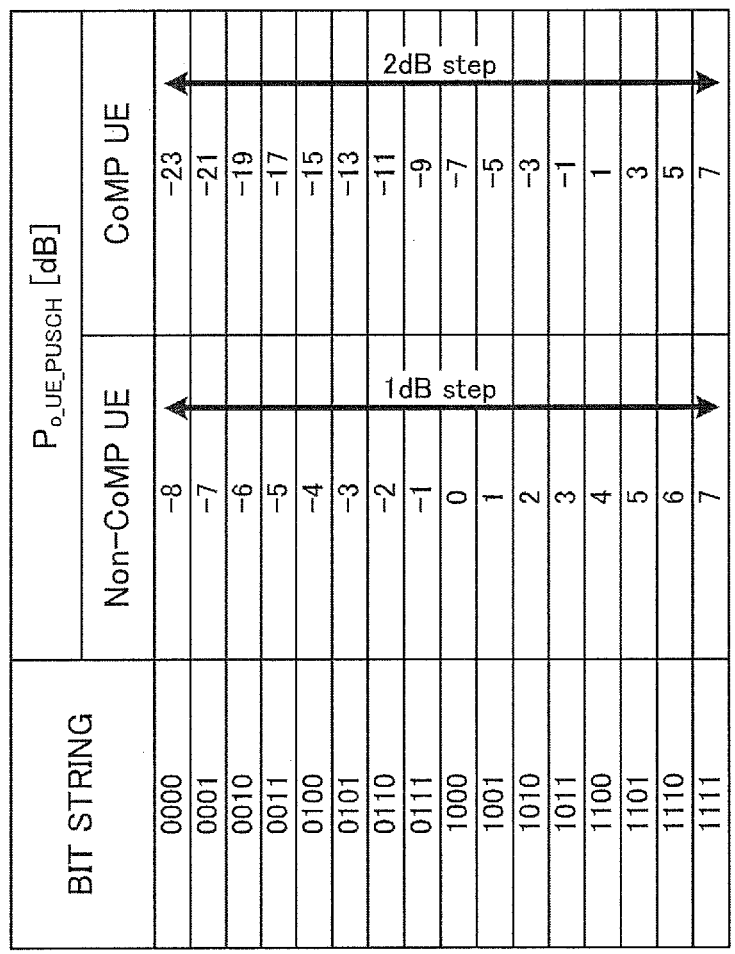
FIG. 7 illustrates a correspondence between a bit string and a dB value according to Embodiment 2 of the present invention.

FIG. 7 illustrates an example of association between control information (bit string) and $P_{o\_UE\_PUSCH,c}(j)$ in the present embodiment. As shown in FIG. 7, the length of the bit string is a fixed value of 4 bits (0000 to 1111) and there are 16 types of $P_{o\_UE\_PUSCH,c}(j)$ that can be indicated by the bit string.

As shown in FIG. 7, 16 values ranging from −8 to 7 [dB] are set as $P_{o\_UE\_PUSCH,c}(j)$ intended for non-CoMP UE. That is, values of −8 to 7 [dB] are set at 1-dB intervals (step width: 1 [dB]) as $P_{o\_UE\_PUSCH,c}(j)$ intended for non-CoMP UE. On the other hand, 16 values ranging from −23 to 7 [dB] are set as $P_{o\_UE\_PUSCH,c}(j)$ intended for CoMP UE. That is, values of −23 to 7 [dB] are set at 2-dB intervals (step width: 2 [dB]) as $P_{o\_UE\_PUSCH,c}(j)$ intended for non-CoMP UE.

That is, as shown in FIG. 7, the interval (step width) between adjacent control values in $P_{o\_UE\_PUSCH,c}(j)$ intended for CoMP UE is greater (larger) than the interval (step width) between adjacent control values in $P_{o\_UE\_PUSCH,c}(j)$ intended for non-CoMP UE. Thus, it is possible to extend the indication range of $P_{o\_UE\_PUSCH,c}(j)$ for CoMP UE using a bit string with the same number of bits (4 bits in FIG. 7) as in the case with non-CoMP UE. That is, as shown in FIG. 7, the difference between a maximum value (7 [dB]) and a minimum value (−23 [dB]) in $P_{o\_UE\_PUSCH,c}(j)$ intended for CoMP UE is greater than the difference between a maximum value (7 [dB]) and a minimum value (−8 [dB]) in $P_{o\_UE\_PUSCH,c}(j)$ intended for non-CoMP UE.

Transmission power control information generating section 203 of base station 200 can set different $P_{o\_UE\_PUSCH,c}(j)$'s using the same control information (bit string) depending on whether terminal 100 is a non-CoMP UE or a CoMP UE. That is, base station 200 can indicate optimum transmission power using the same control information in both cases where terminal 100 is a non-CoMP UE and a CoMP UE. For example, in FIG. 7, transmission power control information generating section 203 can set $P_{o\_UE\_PUSCH,c}(j)=-8$ [dB] intended for non-CoMP UE and $P_{o\_UE\_PUSCH,c}(j)=-23$ [dB] intended for CoMP UE as the same bit string "0000."

Depending on whether terminal 100 is a non-CoMP UE or a CoMP UE, control value calculation section 105 of terminal 100 can read $P_{o\_UE\_PUSCH,c}(j)$ corresponding to control information (bit string) indicated from base station 200, and can thereby appropriately identify control values of transmission power of both non-CoMP UE and CoMP UE. For example, in FIG. 7, when a bit string "0000" is indicated, control value calculation section 105 identifies $P_{o\_UE\_PUSCH,c}(j)=-8$ [dB] if terminal 100 is a non-CoMP UE and identifies $P_{o\_UE\_PUSCH,c}(j)=-23$ [dB] if terminal 100 is a CoMP UE.

Thus, when terminal 100 is not a CoMP UE, terminal 100 calculates transmission power using $P_{o\_UE\_PUSCH,c}(j)$ associated with the indicated bit string of $P_{o\_UE\_PUSCH,c}(j)$ intended for non-CoMP UE and when terminal 100 is a CoMP UE, terminal 100 calculates transmission power using $P_{o\_UE\_PUSCH,c}(j)$ associated with the indicated bit string of $P_{o\_UE\_PUSCH,c}(j)$ intended for CoMP UE.

By so doing, the amount of signaling does not increase in the indication of $P_{o\_UE\_PUSCH,c}(j)$ (FIG. 7) in the present embodiment compared to the indication of conventional $P_{o\_UE\_PUSCH,c}(j)$ (FIG. 1). That is, it is possible to indicate a control value relating to transmission power from base station 200 to terminal 100 without increasing amount of signaling. In the indication of $P_{o\_UE\_PUSCH,c}(j)$ in the present embodiment (FIG. 7), it is not necessary to change the signaling format compared to the indication of conventional $P_{o\_UE\_PUSCH,c}(j)$ (FIG. 1) and prevent the system from becoming complicated due to a change of the signaling format.

That is, according to the present embodiment, it is possible to perform transmission power control on CoMP UE and thereby achieve a system performance improvement effect by UL CoMP without changing the signaling format nor increasing the amount of signaling compared to the indication of conventional $P_{o\_UE\_PUSCH,c}(j)$ (FIG. 1).

Although a transmission power setting error can also be corrected using a TPC command ($f_c(i)$ shown in equation 1) included in uplink allocation control information (UL grant), the method using a TPC command is not efficient. For example, values of +3 dB, +1 dB, 0 dB, −1 dB can be set for $f_c(i)$ shown in equation 1, and correction of a value greater than 3 dB requires a plurality of UL grant transmissions, causing the amount of signaling to increase. Moreover, when an uplink transmission mode of the terminal is changed, the cumulative value of TPC commands is reset. Thus, transmission power needs to be corrected by a plurality of UL grant transmissions every time the transmission mode is changed, which causes overhead to further increase. In contrast, in the present embodiment, appropriate transmission power is set by extending the indication range of $P_{o\_UE\_PUSCH,c}(j)$ which is a terminal-specific parameter for CoMP UE. By so doing, it is possible to avoid the aforementioned occurrence of a plurality of UL grant transmissions.

Embodiment 3

The present embodiment will focus on a use-frequency of each candidate value of $P_{o\_UE\_PUSCH,c}(j)$ taking into account a change of $P_{o\_PUSCH,c}(j)$ (that is, $P_{o\_UE\_PUSCH,c}(j)$ intended for CoMP UE), that is, how often base station 200 makes an indication to each candidate value to terminal 100 in its cell.

A base station and a terminal according to the present embodiment have basic configurations common to those of terminal 100 and base station 200 according to Embodiment 2, and therefore their configurations will be described with reference to FIG. 5 and FIG. 6.

As described above, there are two applications of $P_{o\_UE\_PUSCH,c}(j)$ intended for CoMP UE.

The first application is to correct a path loss measurement error in terminal 100 (UE) as in the case of the conventional one (non-CoMP UE). In this case, the range of values estimated as $P_{o\_UE\_PUSCH,c}(j)$ is −8 to 7 [dB] (e.g., see FIG. 1) and the use-frequency of $P_{o\_UE\_PUSCH,c}(j)$ may be estimated to show a Gaussian distribution in positive and negative directions centered on 0 [dB].

The second application is to correct transmission power (transmission power of CoMP UE) for switching from transmission power intended for the serving cell to a reception point having a minimum path loss. In this case, $P_{o\_UE\_PUSCH,c}(j)$ is used to lower transmission power intended for the serving cell according to path loss difference $\Delta_{PL}$ (e.g., see equation 3). Thus, the use-frequency of $\Delta_{PL}$ is estimated to be distributed in a negative direction (e.g., −16 to 0 [dB]) relative to 0 [dB].

Figure 8:
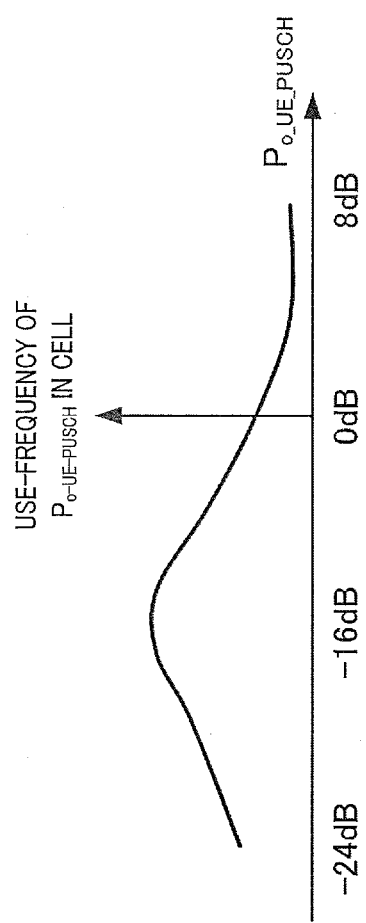
FIG. 8 illustrates a use-frequency of a terminal-specific parameter in a cell according to Embodiment 3 of the present invention.

Thus, when both of the two applications are taken into consideration, the use-frequency of $P_{o\_UE\_PUSCH,c}(j)$ intended for CoMP UE is estimated to be highest in a region of a negative direction relative to 0 [dB] as shown in FIG. 8. That is, as shown in FIG. 8, the use-frequency of $P_{o\_UE\_PUSCH,c}(j)$ intended for CoMP UE in dB values tends to be higher in the region of the negative direction than in the region of the positive direction.

Thus, in the present embodiment, the setting interval (step width) of $P_{o\_UE\_PUSCH,c}(j)$ is made to differ according to the use-frequency of $P_{o\_UE\_PUSCH,c}(j)$ intended for CoMP UE.

Hereinafter, an association rule between control information (bit string) and $P_{o\_UE\_PUSCH,c}(j)$ (dB value) used in control value calculation section 105 of terminal 100 and transmission power control information generating section 203 of base station 200 will be described.

Figure 9:
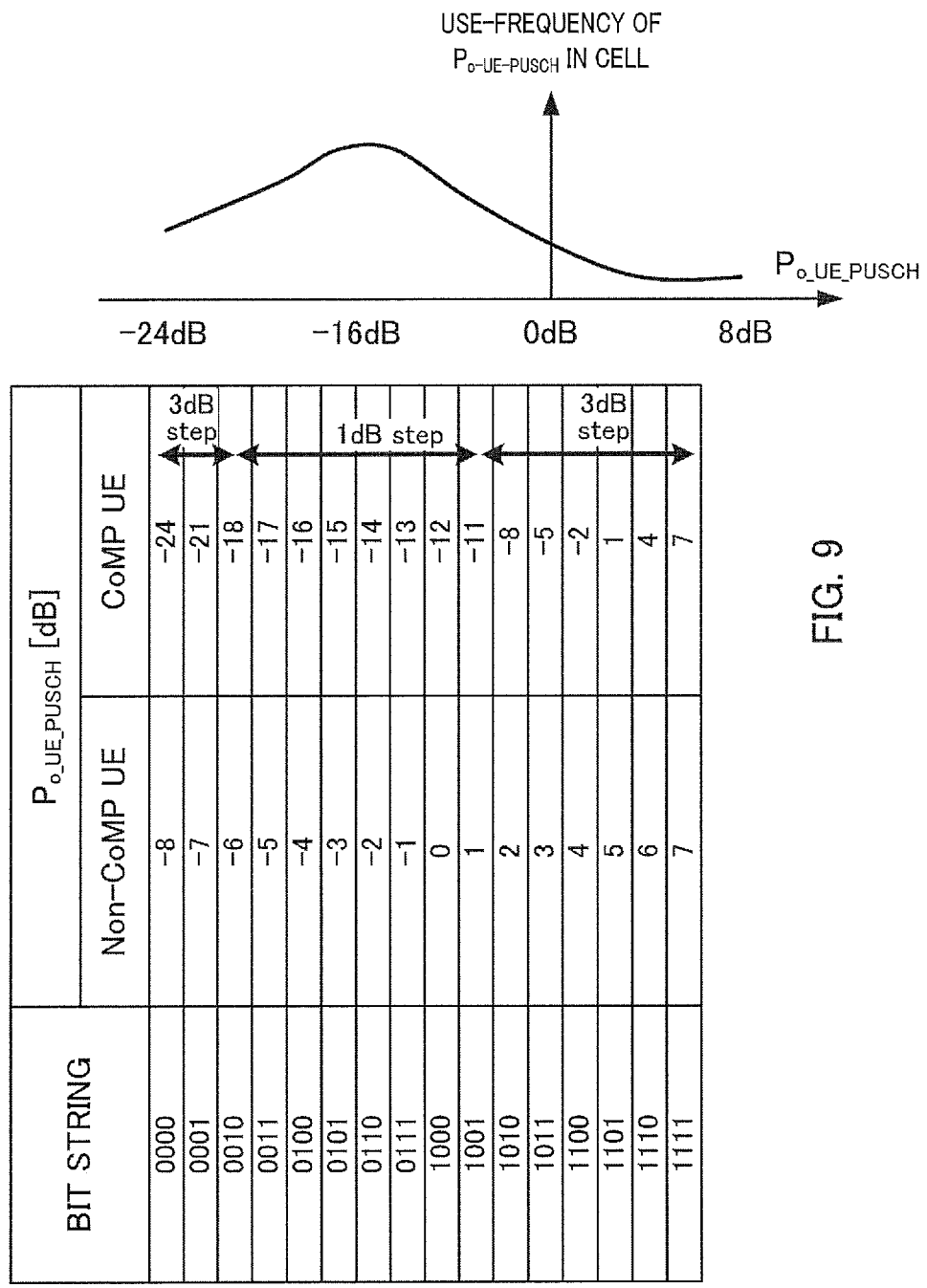
FIG. 9 illustrates a correspondence between a bit string and a dB value according to Embodiment 3 of the present invention.

FIG. 9 illustrates an example of association between control information (bit string) and $P_{o\_UE\_PUSCH,c}(j)$ in the present embodiment.

As shown in FIG. 9, the length of a bit string is a fixed value of 4 bits (0000 to 1111) as in the case of Embodiment 2 (FIG. 7) and there are 16 types of $P_{o\_UE\_PUSCH,c}(j)$ that can be indicated by the bit string. Furthermore, as shown in FIG. 9, values of −8 to 7 [dB] are set with a step width of 1 [dB] as $P_{o\_UE\_PUSCH,c}(j)$ intended for non-CoMP UE as in the case of Embodiment 2.

As shown in FIG. 9, values of −24 to 7 [dB] are set as $P_{o\_UE\_PUSCH,c}(j)$ intended for CoMP UE. However, as shown in FIG. 9, values are set at 1-dB intervals (step width: 1 [dB]) within a range of −18 to −11 [dB] of $P_{o\_UE\_PUSCH,c}(j)$ intended for CoMP UE. In contrast, as shown in FIG. 9, values are set at 3-dB intervals within a range of −24 to −18 [dB] and within a range of −8 to 7 [dB] of $P_{o\_UE\_PUSCH,c}(j)$ intended for CoMP UE (step width: 3 [dB]).

That is, as shown in FIG. 9, among values within the setting range of $P_{o\_UE\_PUSCH,c}(j)$ intended for CoMP UE (−24 to 7 [dB]), values with a finer step width (1 [dB]) are set within a range including values with a higher use-frequency in the cell (−18 to −11 [dB] in FIG. 9) and the interval between adjacent control values is smaller. On the other hand, as shown in FIG. 9, among values within a setting range of $P_{o\_UE\_PUSCH,c}(j)$ intended for CoMP UE (−24 to 7 [dB]), values with a larger step width (3 [dB]) are set in a region including values with a lower use-frequency in the cell (−24 to −18 [dB] or −11 to 7 [dB]) and the interval between adjacent control values is greater.

By so doing, values usable as $P_{o\_UE\_PUSCH,c}(j)$ intended for CoMP UE are set in a detailed manner in a range with a high use-frequency out of the setting range of $P_{o\_UE\_PUSCH,c}(j)$ intended for CoMP UE, and therefore base station 200 can set transmission power for terminal 100 with high accuracy. That is, it is possible to prevent the system performance improvement effect from deteriorating due to a transmission power setting error for CoMP UE.

Within a range with a low use-frequency, since values usable as $P_{o\_UE\_PUSCH,c}(j)$ intended for CoMP UE are set roughly, transmission power setting errors are more likely to occur compared to a range with a high use-frequency. However, transmission power setting errors can also be corrected using a TPC command included in uplink allocation control information (UL grant) ($f_c(i)$ shown in equation 1). Since values of +3 dB, +1 dB, 0 dB and −1 dB can be set for $f_c(i)$ shown, for example, in equation 1, it is possible to compensate for a transmission power setting error caused by the step width (3 [dB]) and adjust the transmission power to appropriate transmission power by indicating a TPC command (e.g., value in a range of ±1 dB) to terminal 100 in which $P_{o\_UE\_PUSCH,c}(j)$ within a range (step width: 3 [dB]) with a rough step width shown in FIG. 9 is set, using the UL grant.

Furthermore, the present embodiment as well as Embodiment 2 performs transmission power control on CoMP UE without changing the signaling format or without increasing the amount of signaling compared to the conventional indication of $P_{o\_UE\_PUSCH,c}(j)$ (FIG. 1), and can thereby achieve a system performance improvement effect by UL CoMP.

Figure 10:
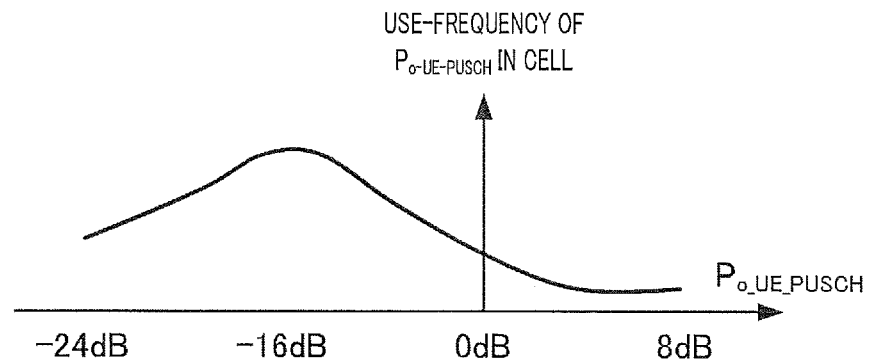
FIG. 10 illustrates another correspondence between a bit string and a dB value according to Embodiment 3 of the present invention.

A case has been described in the present embodiment where the setting range of $P_{o\_UE\_PUSCH,c}(j)$ as shown in FIG. 8 and FIG. 9 is divided into three regions; a region in which the use-frequency of $P_{o\_UE\_PUSCH,c}(j)$ is highest and regions at both ends of the region with the highest use-frequency (regions with a lower use-frequency). However, without being limited to these regions, for simplicity, the setting range of $P_{o\_UE\_PUSCH,c}(j)$ may also be divided into two regions; a region with a high use-frequency and a region with a low use-frequency of $P_{o\_UE\_PUSCH,c}(j)$. For example, as shown in FIG. 10, a range (−23 to −14 [dB]) including candidates of $P_{o\_UE\_PUSCH,c}(j)$ having a value equal to or lower than a predetermined dB value (−14 [dB]) of the setting range (−23 to 7 [dB]) of $P_{o\_UE\_PUSCH,c}(j)$ intended for CoMP UE is estimated to have a higher use-frequency, and therefore values with a smaller step width are set (step width: 1 [dB]). On the other hand, since a range (−14 to 7 [dB]) including $P_{o\_UE\_PUSCH,c}(j)$ candidates having a value equal to or higher than a predetermined dB value (−14 [dB]) is estimated to have a lower use-frequency, values with a larger step width is set (step width: 3 [dB]).

[Embodiment 4]

The present embodiment focuses on the fact that switching from transmission power intended for a serving cell to transmission power intended for a reception point with a minimum path loss (transmission power of CoMP UE) depends on path loss compensation ratio $\alpha_c(j)$.

A base station and a terminal according to the present embodiment have basic configurations common to those of terminal 100 and base station 200 according to Embodiment 2, and therefore their configurations will be described with reference to FIGS. 5 and 6.

In the following description, the range of path loss difference $\Delta_{PL}$ is assumed to be −16 to 0 [dB] and values that can be taken by path loss compensation ratio $\alpha_c(j)$ are assumed to be three types of 0.0, 0.6 and 1.0.

The amount of change of $P_{o\_UE\_PUSCH,c}(j)$ at the time of switching from transmission power intended for the serving cell to transmission power intended for a reception point having a minimum path loss is expressed by $\alpha_c(j) \cdot \Delta_{PL}$ as shown in equation 3. Thus, the greater $\alpha_c(j)$, the greater the above-described amount of change can be.

For example, when $\alpha_c(j)=0.0$, the amount of change $(\alpha_c(j) \cdot \Delta_{PL})$ at the time of switching from transmission power intended for the serving cell to transmission power intended for a reception point with a minimum path loss is 0. On the other hand, when $\alpha_c(j)=0.6$, the above-described amount of change $(\alpha_c(j) \cdot \Delta_{PL})$ is a maximum of 9.6 [dB] (=0.6·16.0). When $\alpha_c(j)=1.0$, the above-described amount of change $(\alpha_c(j) \cdot \Delta_{PL})$ is a maximum of 16.0 [dB] (=1.0·16.0).

Thus, the range of values that can be taken as $P_{o\_UE\_PUSCH,c}(j)$ intended for CoMP UE is estimated to be set depending on the value of $\alpha_c(j)$ as follows:

when $\alpha_c(j)=0.0$: −8 to 7 [dB];
when $\alpha_c(j)=-0.6$: −17.6 to 7 [dB]; and
when $\alpha_c(j)=1.0$: −24 to 7 [dB].

Thus, in the present embodiment, the setting range of $P_{o\_UE\_PUSCH,c}(j)$ intended for CoMP UE is changed according to the value of $\alpha_c(j)$. In other words, in the present embodiment, the setting interval (step width) of $P_{o\_UE\_PUSCH,c}(j)$ intended for CoMP UE is changed according to the value of $\alpha_c(j)$.

Hereinafter, an association rule between control information (bit string) and $P_{o\_UE\_PUSCH,c}(j)$ (dB value) used in control value calculation section 105 of terminal 100 and transmission power control information generating section 203 of base station 200 will be described.

Figure 11:
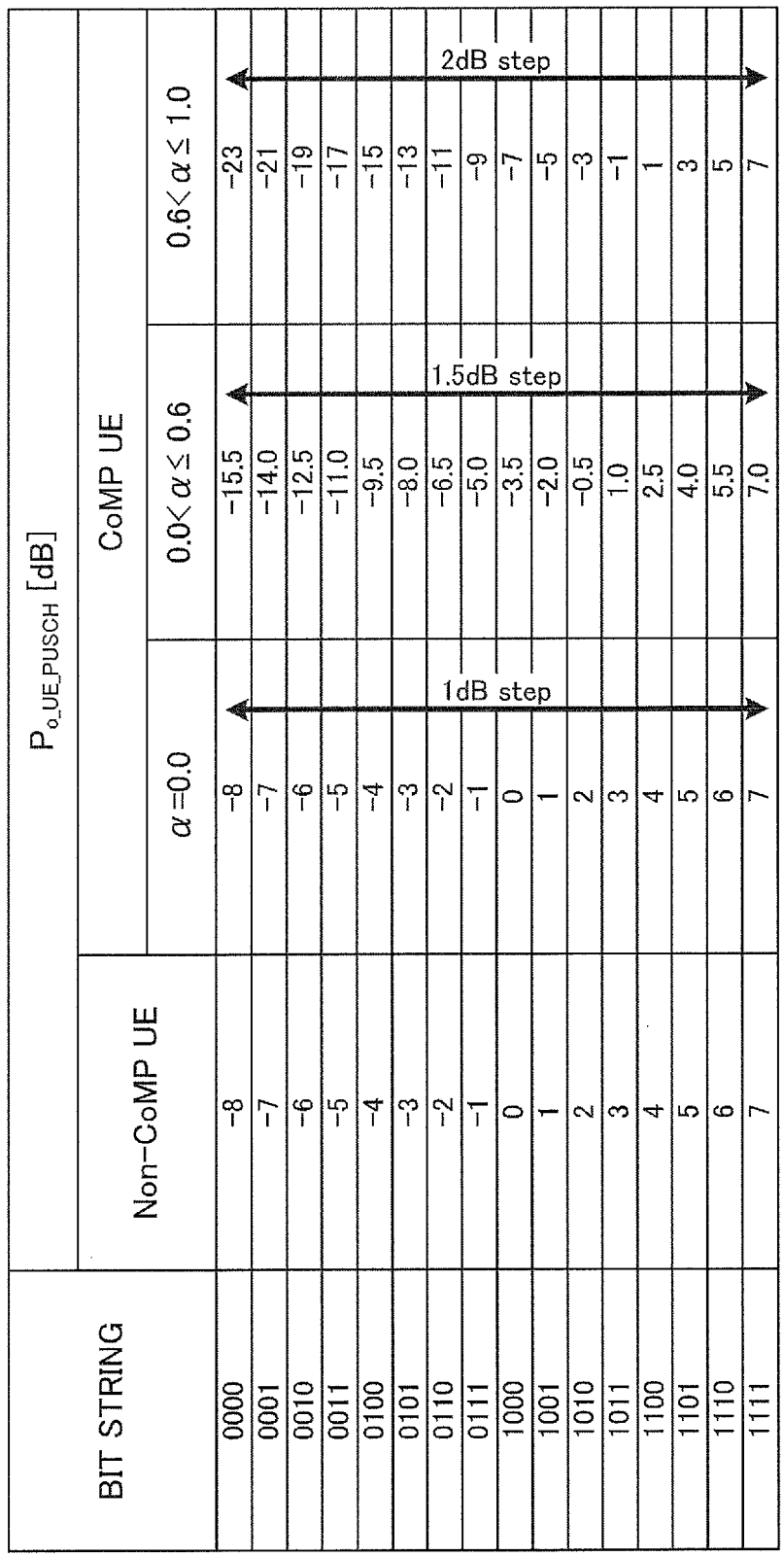
FIG. 11 illustrates a correspondence between a bit string and a dB value according to Embodiment 4 of the present invention.

FIG. 11 illustrates an example of association between control information (bit string) and $P_{o\_UE\_PUSCH,c}(j)$ in the present embodiment.

As shown in FIG. 11, the length of the bit string is a fixed value of 4 bits (0000 to 1111) as in the case of Embodiment 2 (FIG. 7), and there are 16 types of $P_{o\_UE\_PUSCH,c}(j)$ that can be indicated with the bit string. Furthermore, as shown in FIG. 11, as $P_{o\_UE\_PUSCH,c}(j)$ intended for non-CoMP UE, values of −8 to 7 [dB] are set with a step width of 1 [dB] as in the case of Embodiment 2.

As shown in FIG. 11, as $P_{o\_UE\_PUSCH,c}(j)$ intended for CoMP UE in which $\alpha_c(j)=0.0$ is set, values of −8 to 7 [dB] are set with a step width of 1 [dB].

As shown in FIG. 11, as $P_{o\_UE\_PUSCH,c}(j)$ intended for CoMP UE in which $\alpha_c(j)=0.6$ (or $0.0<\alpha_c(j)\le0.6$) is set, values of −15.5 to 7.0 [dB] are set with a step width of 1.5 [dB].

As shown in FIG. 11, as $P_{o\_UE\_PUSCH,c}(j)$ intended for CoMP UE in which $\alpha_c(j)=1.0$ (or $0.6<\alpha_c(j)\le1.0$) is set, values of −23 to 7 [dB] are set with a step width of 2 [dB].

By this means, the range of values to be indicated is changed based on control information (bit string of 4 bits) according to $\alpha_c(j)$. More specifically, as shown in FIG. 11, the greater $\alpha_c(j)$, the wider the setting range of $P_{o\_UE\_PUSCH,c}(j)$ intended for CoMP UE becomes. In other words, the greater $\alpha_c(j)$, the greater the difference between a maximum value and a minimum value in $P_{o\_UE\_PUSCH,c}(j)$ intended for CoMP UE. That is, as shown in FIG. 11, the greater $\alpha_c(j)$, the greater the setting interval (step width) of $P_{o\_UE\_PUSCH,c}(j)$ intended for CoMP UE becomes.

By so doing, since $P_{o\_UE\_PUSCH,c}(j)$ intended for CoMP UE is set to a value in a range estimated according to $\alpha_c(j)$, base station 200 can appropriately set transmission power intended for terminal 100 according to $\alpha_c(j)$.

The present embodiment (FIG. 11) will be compared with Embodiment 2 (FIG. 7), for example. In FIG. 7, values of −23 to 7 [dB] are set with a step width of 2 [dB] as $P_{o\_UE\_PUSCH,c}(j)$ intended for CoMP UE independently of $\alpha_c(j)$. In contrast, in FIG. 11, when $\alpha_c(j)=1.0$, values of −23 to 7 [dB] are set with a step width of 2 [dB] as $P_{o\_UE\_PUSCH,c}(j)$ intended for CoMP UE, and when $\alpha_c(j)=0.0$, values of −8 to 7 [dB] are set with of 1 [dB] as $P_{o\_UE\_PUSCH,c}(j)$ intended for CoMP UE.

That is, in the present embodiment, particularly, the smaller $\alpha_c(j)$, the smaller is the setting interval (step width) of values to be set as $P_{o\_UE\_PUSCH,c}(j)$ intended for CoMP UE, and base station 200 can thereby set transmission power for terminal 100 with higher accuracy. That is, the present embodiment can set transmission power intended for terminal 100 more accurately than Embodiment 2, and can thereby prevent deterioration of the system performance improvement effect due to a transmission power setting error.

According to the present embodiment as well as Embodiment 2, it is possible to perform transmission power control on CoMP UE without changing the signaling format or without increasing the amount of signaling, and thereby achieve a system performance improvement effect by UL CoMP compared to the indication of conventional $P_{o\_UE\_PUSCH,c}(j)$ (FIG. 1).

A case has been described in the present embodiment where path loss compensation ratio $\alpha c(j)$ is a cell-specific parameter. However, the present embodiment is likewise applicable to a case where path loss compensation ratio $\alpha c(j)$ is newly introduced as a terminal-specific parameter as well. That is, effects similar to those of the present embodiment can be obtained by adjusting a setting range (step width) of $P_{o\_UE\_PUSCH,c}(j)$ intended for CoMP UE in accordance with terminal-specific path loss compensation ratio $\alpha c(j)$.

[Other Embodiments]

(1) In the above-described embodiments, "CoMP UE" need not be a terminal to which coordinated reception by a plurality of base stations is always applied. For example, terminals (UEs) in (i) to (iv) below may also be used as CoMP UEs.

(i) A terminal that transmits an uplink signal for a cell (base station) different from a serving cell. This case does not depend on whether received signals are combined among a plurality of cells or not.

(ii) A terminal in which a terminal-specific DMRS (Demodulation Reference Signal) sequence can be set or a terminal in which a DMRS sequence is set.

(iii) A terminal in which a virtual cell ID can be set or a terminal in which a virtual cell ID is set.

(iv) A terminal explicitly indicated from a base station that it is CoMP UE.

(2) A case has been described in the above-described embodiments where conversion between a bit string representing $P_{o\_UE\_PUSCH,c}(j)$ and a dB value is performed using the tables shown in FIG. 7, FIG. 9, FIG. 10 and FIG. 11. However, $P_{o\_UE\_PUSCH,c}(j)$ may also be derived using an equation instead of the above-described tables. For example, $P_{o\_UE\_PUSCH,c}(j)$ may be derived according to equation 4.

[4]

$$P_{dB}=P_{bit}\cdot\Delta_{step}+P_{dB\_MIN} \qquad \text{(Equation 4)}$$

In equation 4, $P_{dB}$ represents a dB value of $P_{o\_UE\_PUSCH,c}(j)$, $P_{bit}$ represents a bit string ($P_{bit}=0$ to 15 in the case of 4 bits), $\Delta_{step}$ represents a step width [dB] and $P_{dB\_MIN}$ represents a minimum dB value.

Moreover, $\Delta_{step}$ and $P_{dB\_MIN}$ shown in equation 4 have different values between non-CoMP UE and CoMP UE. For example, FIG. 12A shows $\Delta_{step}$ and $P_{dB\_MIN}$ corresponding to the correspondence in the table shown in FIG. 7 and FIG. 12B shows $\Delta_{step}$ and $P_{dB\_MIN}$ corresponding to the correspondence in the table shown in FIG. 11. Thus, by deriving a dB value of $P_{o\_UE\_PUSCH,c}(j)$ using the equation, terminal 100 and base station 200 need not hold beforehand the tables in FIG. 7, FIG. 11 or the like, and it is thereby possible to reduce the amount of memory used of terminal 100 and base station 200.

Moreover, for example, when the maximum value of $P_{o\_UE\_PUSCH,c}(j)$ is the same between non-CoMP UE and CoMP UE as shown in FIG. 7 or FIG. 11 (7 dB in FIG. 7 and FIG. 11), $P_{o\_UE\_PUSCH,c}(j)$ may be derived using following equation 5.

[5]

$$P_{dB}=(P_{bit}-15)\cdot\Delta_{step}+7 \qquad \text{(Equation 5)}$$

When equation 5 is used, since terminal 100 and base station 200 need only to hold $\Delta_{step}$ shown in FIG. 12A and FIG. 12B, it is possible to further reduce the amount of memory used of terminal 100 and base station 200 compared to the case where equation 4 is used.

Furthermore, $\Delta_{step}$ and $P_{dB\_MIN}$ may be indicated from base station 200 to terminal 100 every time $P_{o\_UE\_PUSCH,c}(j)$ is indicated. In this way, since there is no more information that needs to be held beforehand regarding $P_{o\_UE\_PUSCH,c}(j)$ in terminal 100 and base station 200, it is possible to further reduce the amount of memory used of terminal 100 and base station 200 and perform transmission power control appropriate for each cell.

(3) Transmission power control of a data signal (PUSCH) has been described in the above-described embodiments, but the transmission power control target of the present invention is not limited to data signals. The present invention is applicable to a case where an uplink signal is transmitted to a cell different from a serving cell. Uplink signals intended for a cell different from the serving cell may be, for example, SRS, DMRS, PUCCH (Physical Uplink Control Channel) and PRACH.

Figure 13:
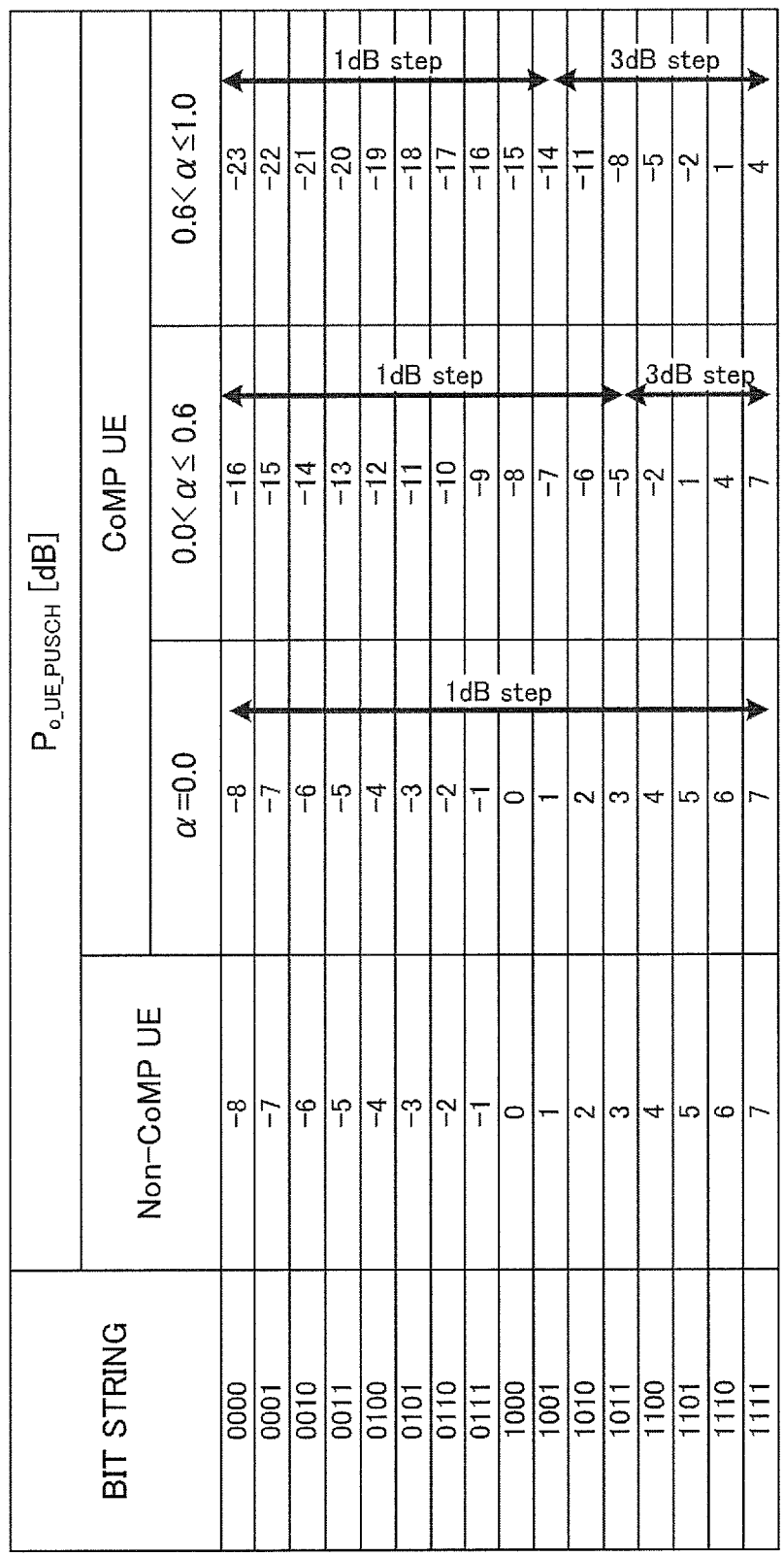
FIG. 13 illustrates a correspondence between a bit string and a dB value according to still another embodiment of the present invention.

(4) Embodiment 3 and Embodiment 4 may be combined. That is, as shown in FIG. 13, as in the case of Embodiment 4, the setting range (step width) of $P_{o\_UE\_PUSCH,c}(j)$ intended for CoMP UE may be made to differ depending on $\alpha_c(j)$ and as in the case of Embodiment 3, the step width may be made to differ depending on the use-frequency of each value of $P_{o\_UE\_PUSCH,c}(j)$ in $P_{o\_UE\_PUSCH,c}(j)$ for each $\alpha_c(j)$. By so doing, it is possible to appropriately set the setting range and step width of $P_{o\_UE\_PUSCH,c}(j)$ and thereby achieve a system performance improvement effect by UL CoMP.

(5) The setting range (step width) of $P_{o\_UE\_PUSCH,c}(j)$ may be made to differ according to the magnitude of CRE (Cell Range Expansion) in a pico cell as a transmission target by CoMP UE in uplink. Here, CRE is a technique of expanding the area from which a pico cell is selected. In CRE, an offset value (value set by a dB value, CRE offset value) is added to a connection link selection criteria of the pico cell (e.g., downlink receiving power or propagation loss or the like). For example, in the case where the CRE offset value is positive, if the area in which the terminal is connected to the pico cell expands (e.g., see FIG. 14B) and the CRE offset value is negative, the area in which the terminal is connected to the pico cell shrinks (not shown). For example, the CRE offset value can be estimated using information indicated to the terminal beforehand (e.g., value of CellsToAddMod::cellIndividualOffset of MeasObject-EUTRA described in "3GPP TS36.331").

Figure 14A:
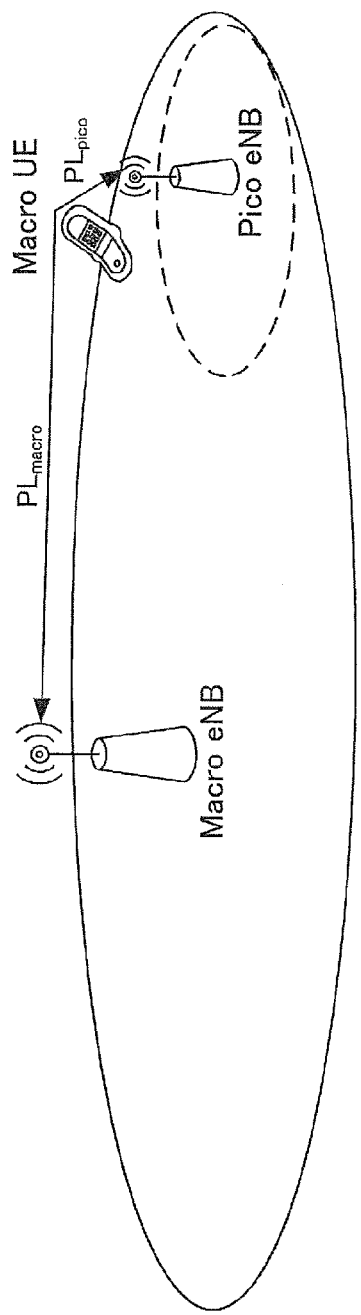
FIGS. 14A and 14B are diagrams provided for describing CRE according to still another embodiment of the present invention.
Figure 14B:
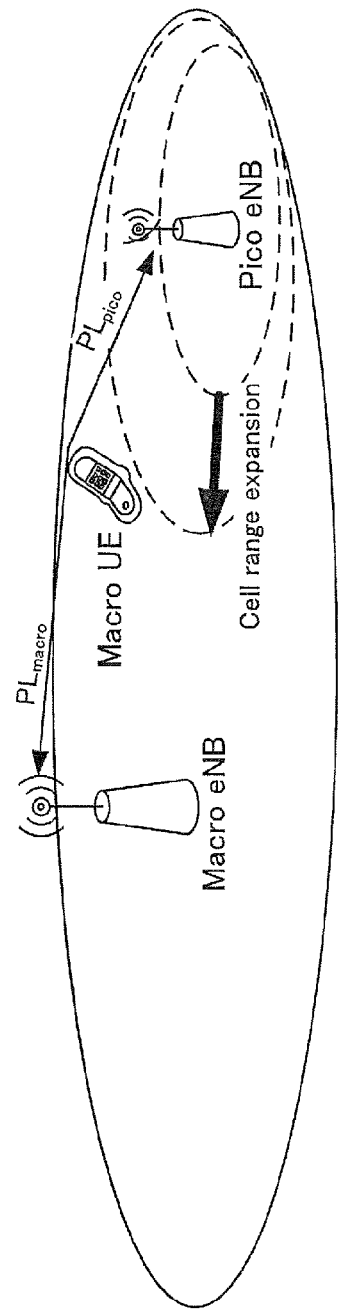

As shown in FIG. 14A (when the CRE offset value is small) and FIG. 14B (when the CRE offset value is large), the greater the CRE offset value, the smaller the difference between the path loss between the macro UE and macro eNB ($PL_{macro}$ in FIG. 14A and FIG. 14B) and the path loss between the macro UE and pico eNB ($PL_{pico}$ in FIG. 14A and FIG. 14B) becomes. For this reason, the greater the CRE offset value, the narrower the range of values that can be taken by $P_{o\_UE\_PUSCH,c}(j)$ (setting range) becomes. That is, the greater the CRE offset value, the smaller the step width of $P_{o\_UE\_PUSCH,c}(j)$ can become.

Figure 15:
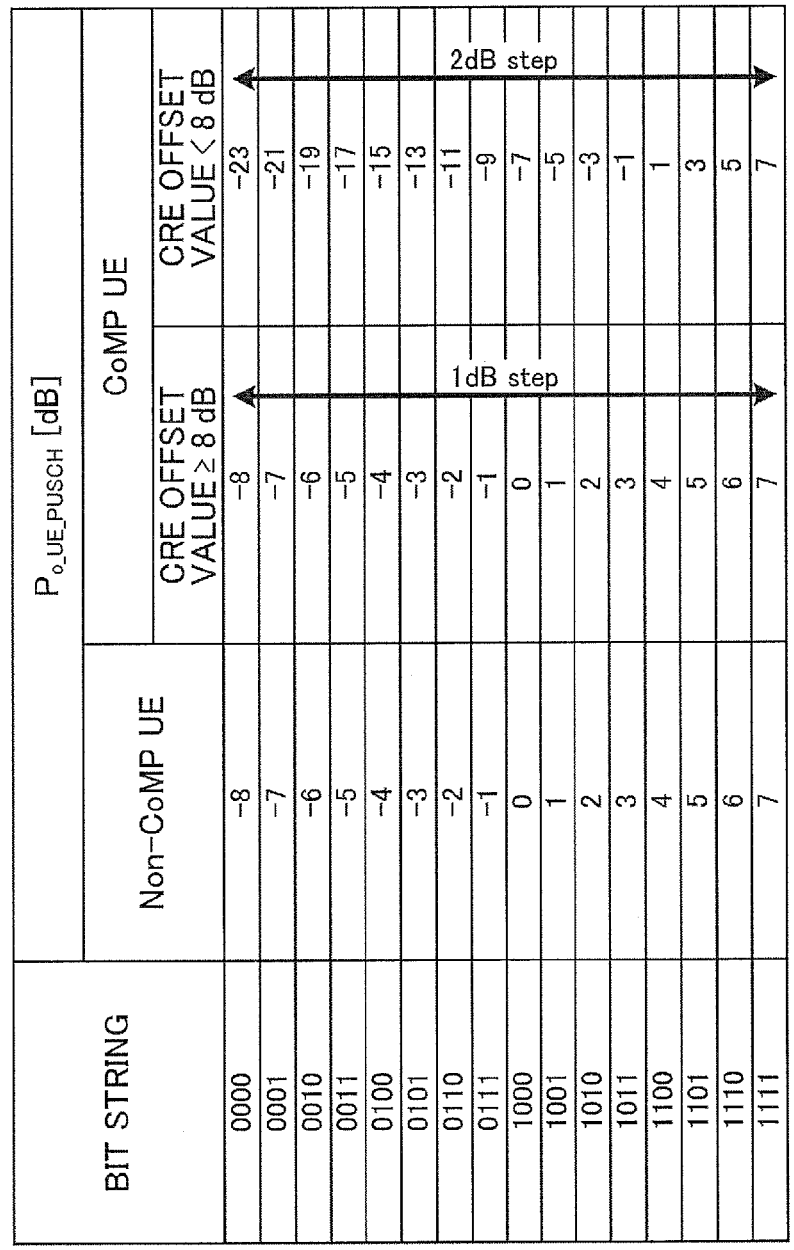
FIG. 15 illustrates a correspondence between a bit string and a dB value according to still another embodiment of the present invention.

Thus, for example, as shown in FIG. 15, when the CRE offset value is equal to or greater than a predetermined value (8 dB in FIG. 15) (e.g., see FIG. 14B), the setting range of $P_{o\_UE\_PUSCH,c}(j)$ for CoMP UE may be set to −8 to 7 [dB] and the step width may be set to a 1-dB step. On the other hand, as shown in FIG. 15, when the CRE offset value is less than the predetermined value (8 dB in FIG. 15) (e.g., see FIG. 14A), the setting range of $P_{o\_UE\_PUSCH,c}(j)$ for CoMP UE may be set to −23 to 7 [dB] and the step width may be set to a 2-dB step. By so doing, grasping only the CRE offset value applied by a pico cell neighboring terminal 100 will allow $P_{o\_UE\_PUSCH,c}(j)$ for CoMP UE to be appropriately set without additional signaling. Moreover, FIG. 15 may be combined with the configuration of Embodiment 3 (FIG. 9 or FIG. 10).

(6) Note that, although each embodiment has been described with an example in which an aspect of this disclosure is configured with hardware by way of example, the present disclosure may also be realized by software in concert with hardware.

In addition, the functional blocks used in the description of each embodiment are typically implemented as LSI devices, which are integrated circuits. The functional blocks may be formed as individual chips, or a part or all of the functional blocks may be integrated into a single chip. The term "LSI" is used herein, but the terms "IC," "system LSI," "super LSI" or "ultra LSI" may be used as well depending on the level of integration.

In addition, the circuit integration is not limited to LSI and may be achieved by dedicated circuitry or a general-purpose processor other than an LSI. After fabrication of LSI, a field programmable gate array (FPGA), which is programmable, or a reconfigurable processor which allows reconfiguration of connections and settings of circuit cells in LSI may be used.

Should a circuit integration technology replacing LSI appear as a result of advancements in semiconductor technology or other technologies derived from the technology, the functional blocks could be integrated using such a technology. Another possibility is the application of biotechnology, for example.

A transmitting apparatus according to the present disclosure includes: a control section that controls transmission power based on a bit string indicated from a receiving apparatus and a correspondence in which the bit strings are associated with a first control value candidate group and a second control value candidate group relating to transmission power, using, when the transmitting apparatus is not a coordinated reception target of a plurality of receiving apparatuses, a control value candidate associated with the indicated bit string in the first control value candidate group, and using, when the transmitting apparatus is the coordinated reception target, a control value candidate associated with the indicated bit string in the second control value candidate group; and a transmitting section that transmits a signal using the transmission power.

In the transmitting apparatus according to the present disclosure, an interval between adjacent control value candidates in the second control value candidate group is greater than an interval between adjacent control value candidates in the first control value candidate group.

In the transmitting apparatus according to the disclosure, a difference between a maximum value and a minimum value in the second control value candidate group is greater than a difference between a maximum value and a minimum value in the first control value candidate group.

In the transmitting apparatus according to the disclosure, each control value candidate of the second control value candidate group is set within a range of values acceptable by control value candidates of the first control value candidate group and within a range of values acceptable as control values relating to control of transmission power during the coordinated reception.

In the transmitting apparatus according to the disclosure, in the second control value candidate group, the interval between adjacent control value candidates is smaller in a first range including control value candidates with a higher use-frequency, and the interval between adjacent control value candidates is greater in a second range including control value candidates with a lower use-frequency.

In the transmitting apparatus according to the disclosure, in the second control value candidate group, an interval between adjacent control value candidates is smaller in a first range including control value candidates equal to or lower than a predetermined value and an interval between adjacent control value candidates is greater in a second range including control value candidates equal to or greater than the predetermined value.

In the transmitting apparatus according to the disclosure, a path loss compensation ratio used for the control of transmission power is indicated from the receiving apparatus to the transmitting apparatus; and in the association, the greater the path loss compensation ratio in the second control value candidate group, the greater is the interval between adjacent control value candidates.

In the transmitting apparatus according to the disclosure: a path loss compensation ratio used for the control of transmission power is indicated from the receiving apparatus to the transmitting apparatus; and in the association, the greater the path loss compensation ratio, the greater is the difference between a maximum value and a minimum value in the second control value candidate group.

In the transmitting apparatus according to the disclosure, the control section determines that the transmitting apparatus is the coordinated reception target when a reference signal sequence specific to a transmitting apparatus is set from the receiving apparatus to the transmitting apparatus or when a reference signal sequence specific to a transmitting apparatus is settable from the receiving apparatus to the transmitting apparatus.

In the transmitting apparatus according to the disclosure, the control section determines, when a signal is transmitted to a receiving apparatus other than the receiving apparatus that indicates the bit string intended for the transmitting apparatus, that the transmitting apparatus is the coordinated reception target, and determines, when a signal is transmitted to a receiving apparatus that indicates the bit string intended for the transmitting apparatus, that the transmitting apparatus is not the coordinated reception target.

A receiving apparatus according to this disclosure includes: a signal generating section that generates a control signal including a bit string set based on a correspondence in which the bit strings are associated with a first control value candidate group and a second control value candidate group relating to transmission power of a transmitting apparatus; and a transmitting section that transmits the control signal, in which: when the transmitting apparatus is not a coordinated reception target of a plurality of receiving apparatuses, a control value candidate associated with the set bit string in the first control value candidate group is used, and when the transmitting apparatus is the coordinated reception target, a control value candidate associated with the set bit string in the second control value candidate group is used.

A transmission power control method according to this disclosure is a method for controlling transmission power based on a bit string indicated from a receiving apparatus and a correspondence between the bit strings and a control value relating to transmission power, the method including: associating, in the correspondence, the bit strings with a first control value candidate group and a second control value candidate group; and calculating transmission power, when the transmitting apparatus is not a coordinated reception target of a plurality of receiving apparatuses, a using control value candidate associated with the indicated bit string in the first control value candidate group, and calculating transmission power, when the transmitting apparatus is the coordinated reception target, using a control value candidate associated with the indicated bit string in the second control value candidate group.

The disclosure of Japanese Patent Application No. 2012-051836 filed on Mar. 8, 2012, including the specification, drawings, and abstract, is incorporated herein by reference in its entirety.

INDUSTRIAL APPLICABILITY

The present invention is used for mobile communication systems.

REFERENCE SIGNS LIST

100 Terminal
200 Base station
101, 206 Receiving section
102, 213 Demodulation section
103 Control section
104 CoMP determining section
105 Control value calculation section
106 Transmission power control section
107, 201 Signal generating section
108 Coding section
109, 204 Modulation section
110 DFT section
111 Mapping section
112 IFFT section
113 CP adding section
114, 205 Transmitting section
115 D/A section
116 Amplification section
117 Up-conversion section
202 Path loss difference estimation section
203 Transmission power control information generating section
207 Signal processing section
208 CP removing section
209 FFT section
210 Demapping section
211 Frequency domain equalization section
212 IDFT section
214 Decoding section

The invention claimed is:

1. A transmitting apparatus comprising:
a control section that controls transmission power based on a bit string indicated from a receiving apparatus and a correspondence in which bit strings are associated with a first target value candidate group and a second target value candidate group relating to a target value of the transmission power; and
a transmitting section that transmits a signal using the transmission power, wherein,
the first target value candidate group includes first target value candidates used for transmission power control for a serving cell;
the second target value candidate group includes second target value candidates calculated by subtracting a path loss difference from the first target value candidates, the path loss difference being a difference between a minimum path loss level among path loss levels between the transmitting apparatus and a plurality of receiving apparatus, and a path loss level between the transmitting apparatus and the serving cell; and the control section uses, when the transmitting apparatus is not a coordinated reception target of the plurality of receiving apparatuses, a first target value candidate associated with the indicated bit string in the first target value candidate group, and uses, when the transmitting apparatus is the coordinated reception target, a second target value candidate associated with the indicated bit string in the second target value candidate group, the second target value candidate being equal to or less than the first target value candidate.

2. The transmitting apparatus according to claim 1, wherein an interval between adjacent control value candidates in the second target value candidate group is greater than an interval between adjacent control value candidates in the first target value candidate group.

3. The transmitting apparatus according to claim 1, wherein a difference between a maximum value and a minimum value in the second target value candidate group is greater than a difference between a maximum value and a minimum value in the first target value candidate group.

4. The transmitting apparatus according to claim 1, wherein each target value candidate of the second target value candidate group is set within a range of values acceptable as first target value candidates of the first target value candidate group and within a range of values acceptable as target values relating to control of transmission power during the coordinated reception.

5. The transmitting apparatus according to claim 1, wherein, in the second target value candidate group, an interval between adjacent second target value candidates is smaller in a first range including second target value candidates with a higher use-frequency, and an interval between adjacent second target value candidates is greater in a second range including second target value candidates with a lower use-frequency.

6. The transmitting apparatus according to claim 1, wherein, in the second target value candidate group, an interval between adjacent second target value candidates is smaller in a first range including second target value candidates equal to or lower than a determined value and an interval between adjacent second target value candidates is greater in a second range including second target value candidates equal to or greater than the determined value.

7. The transmitting apparatus according to claim 1, wherein:
a path loss compensation ratio used for the control of transmission power is indicated from the receiving apparatus to the transmitting apparatus; and
in the association, the greater the path loss compensation ratio in the second target value candidate group, the greater is an interval between adjacent second target value candidates.

8. The transmitting apparatus according to claim 1, wherein:
a path loss compensation ratio used for the control of transmission power is indicated from the receiving apparatus to the transmitting apparatus; and
in the association, the greater the path loss compensation ratio, the greater is the difference between a maximum value and a minimum value in the second target value candidate group.

9. The transmitting apparatus according to claim 1, wherein the control section determines that the transmitting apparatus is the coordinated reception target when a reference signal sequence specific to a transmitting apparatus is set from the receiving apparatus to the transmitting apparatus or when a reference signal sequence specific to a transmitting apparatus is settable from the receiving apparatus to the transmitting apparatus.

10. The transmitting apparatus according to claim 1, wherein the control section determines, when a signal is transmitted to a receiving apparatus other than the receiving apparatus that indicates the bit string intended for the transmitting apparatus, that the transmitting apparatus is the coordinated reception target, and determines, when a signal is transmitted to a receiving apparatus that indicates the bit string intended for the transmitting apparatus, that the transmitting apparatus is not the coordinated reception target.

11. A receiving apparatus comprising:
a signal generating section that generates a control signal including a bit string set based on a correspondence in which bit strings are associated with a first target value candidate group and a second target value candidate group relating to a target value of transmission power of a transmitting apparatus; and
a transmitting section that transmits the control signal,
wherein:
when the transmitting apparatus is not a coordinated reception target of a plurality of receiving apparatuses, a first target value candidate associated with the set bit string in the first target value candidate group is used, and when the transmitting apparatus is the coordinated reception target, a second target value candidate associated with the set bit string in the second target value candidate group is used, the first target value candidate group including first target value candidates used for transmission power control for a serving cell, the second target value candidate group including second target value candidates calculated by subtracting a path loss difference from the first target value candidates, the path loss difference being a difference between a minimum path loss level among path loss levels between the transmitting apparatus and the plurality of receiving apparatus, and a path loss level between the transmitting apparatus and the serving cell, and the second target value candidate being equal to or less than the first target value candidate.

12. A transmission power control method for controlling transmission power of a transmitting apparatus based on a bit string indicated from a receiving apparatus and a correspondence between bit strings and target values of the transmission power, the method comprising:
associating, in the correspondence, the bit strings with a first target value candidate group and a second target value candidate group, the first target value candidate group including first target value candidates used for transmission power control for a serving cell, the second target value candidate group including second target value candidates calculated by subtracting a path loss difference from the first target value candidates, the path loss difference being a difference between a minimum path loss level among path loss levels between the transmitting apparatus and a plurality of receiving apparatus, and a path loss level between the transmitting apparatus and the serving cell; and
calculating transmission power, when the transmitting apparatus is not a coordinated reception target of the plurality of receiving apparatuses, using a first target value candidate associated with the indicated bit string in the first target value candidate group, and calculating transmission power, when the transmitting apparatus is the coordinated reception target, using a second target value candidate associated with the indicated bit string in the second target value candidate group, the second target value candidate being equal to or less than the first target value candidate.

* * * * *